(12) United States Patent
Miyata et al.

(10) Patent No.: US 6,781,777 B2
(45) Date of Patent: Aug. 24, 2004

(54) MASTER INFORMATION CARRIER AND METHOD FOR MANUFACTURING INFORMATION RECORDING MEDIUM USING THE SAME

(75) Inventors: Keizo Miyata, Osaka (JP); Hideyuki Hashi, Osaka (JP); Tatsuaki Ishida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 276 days.

(21) Appl. No.: 09/983,077

(22) Filed: Oct. 23, 2001

(65) Prior Publication Data

US 2002/0048106 A1 Apr. 25, 2002

(30) Foreign Application Priority Data

Oct. 25, 2000 (JP) ..................................... P2000-325392
Sep. 14, 2001 (JP) ..................................... P2000-279488

(51) Int. Cl.$^7$ ................................................. G11B 5/86
(52) U.S. Cl. ........................................ 360/17; 360/16
(58) Field of Search ............................ 360/16, 17, 131, 360/132, 134, 137, 135; 428/694, 66.7; 427/129

(56) References Cited

U.S. PATENT DOCUMENTS 6,347,016 B1 * 2/2002 Ishida et al. .................. 360/17

FOREIGN PATENT DOCUMENTS

| JP | 10-40544 | 2/1998 |
| JP | 10-269566 | 10/1998 |

* cited by examiner

*Primary Examiner*—David Hudspeth
*Assistant Examiner*—Glenda P. Rodriguez
(74) *Attorney, Agent, or Firm*—McDermott Will & Emery LLP

(57) ABSTRACT

A high-level region and a low-level region are formed on a surface of a nonmagnetic base member, in which high-level region is formed a ferromagnetic thin film pattern which corresponds to a preformat information signal, in such a structure that a flow promoting shape of such a shape (e.g., smooth curved shape, polygonal shape) that inhibits the stagnation of a flow of a detergent to promote the flow in order to prevents sticking and residing of foreign matter contained in the detergent is formed at an area where the detergent is liable to stagnate in the high-level region, i.e. at an inner radial portion of a disk-shaped mater information carrier.

13 Claims, 22 Drawing Sheets

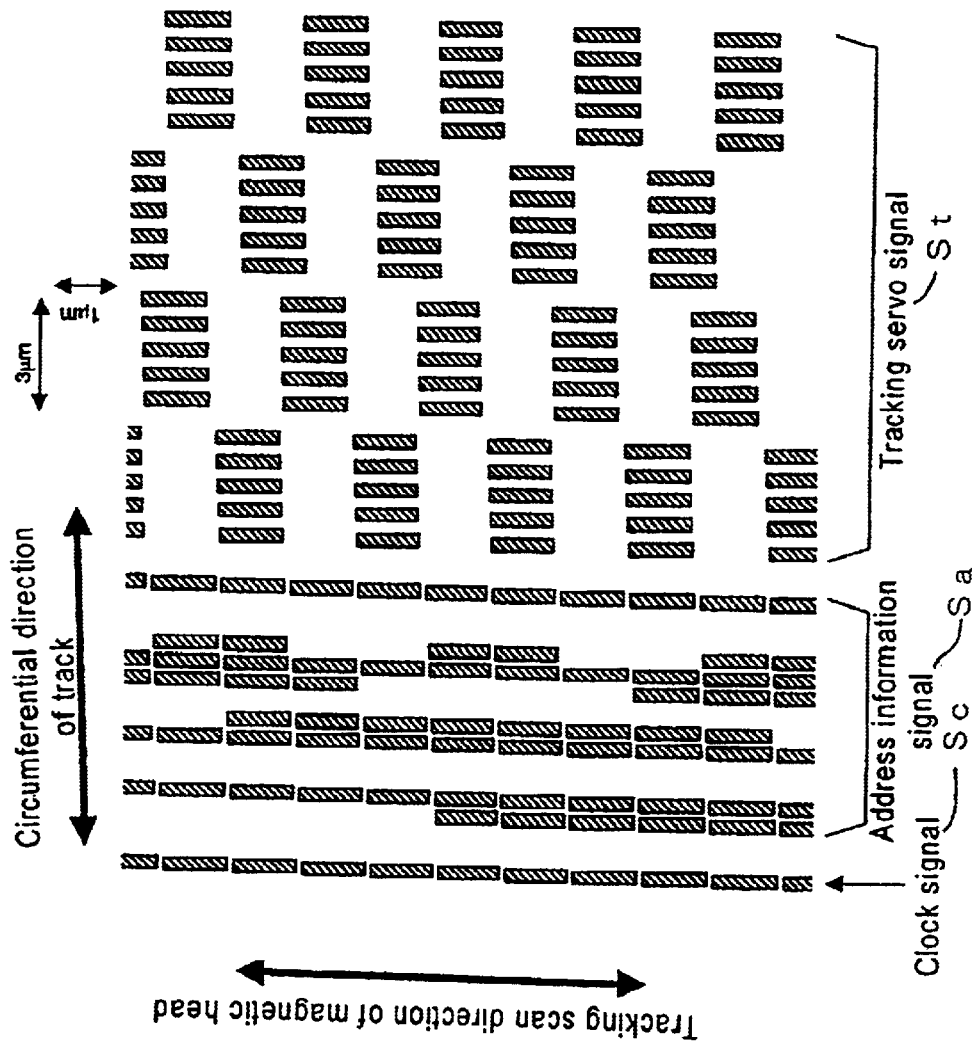

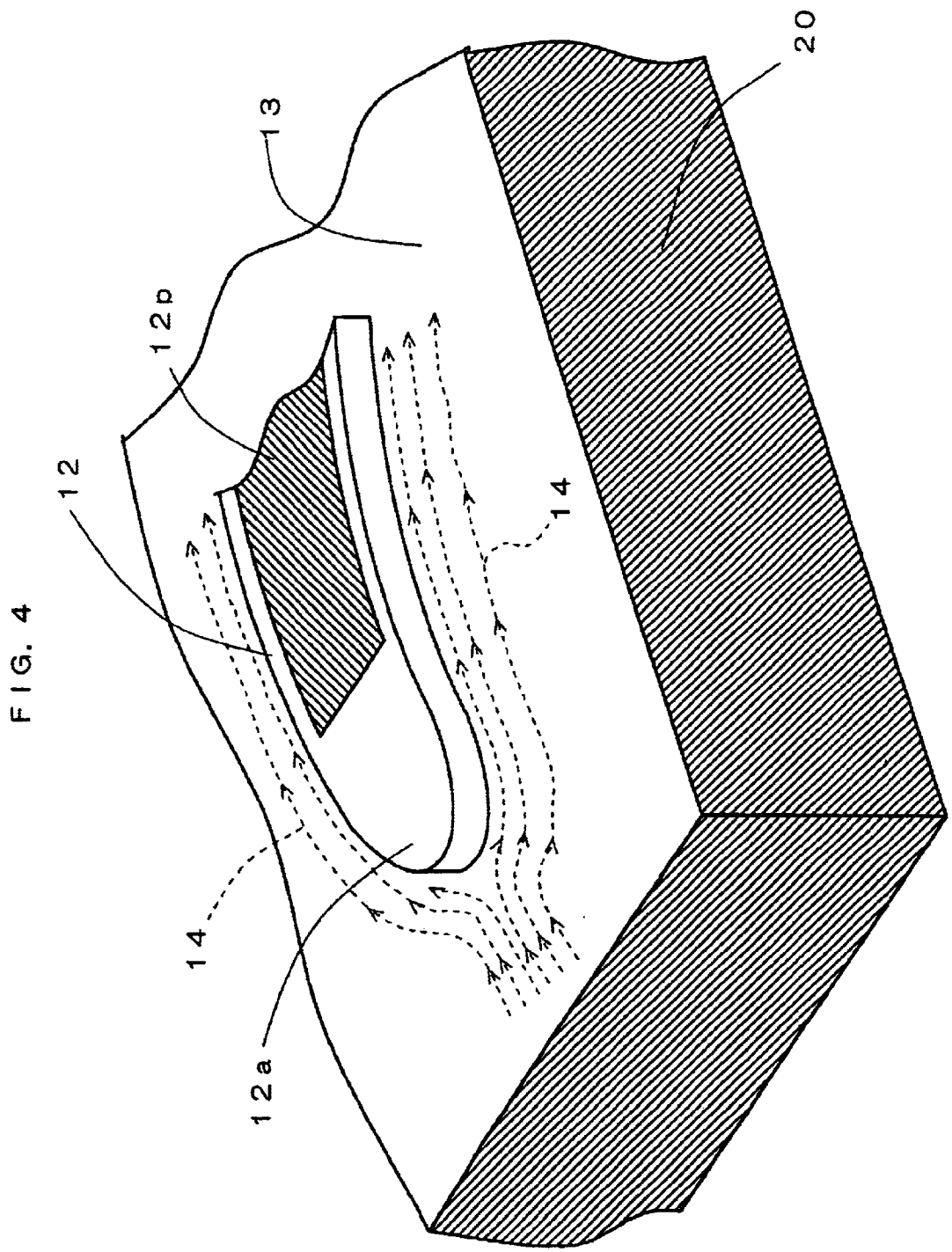

MASTER INFORMATION CARRIER AND METHOD FOR MANUFACTURING INFORMATION RECORDING MEDIUM USING THE SAME

BACKGROUND OF THE INVENTION

1. Field of the Invention

The present invention relates to a master information carrier which is used when an information signal such as of preformat information is initially recorded to an information recording medium and also which has such a region, on the surface of a base member, in which a pattern corresponding to such an information signal is formed that is higher in level than the other regions. More particularly, the present invention relates to a technology for eliminating such damages and improper uniform adhesion of the information medium due to sticking/residing of foreign matter at the time of transfer-wise recording of the information signal to the information recording medium.

2. Description of the Related Art

A master information carrier is used to transfer and record a preformat information signal to a magnetic recording medium. The preformat information signals include a tracking servo signal, an address information signal, a reproduction clock signal and the like. Such a signal is recorded at a constant angle pitch in each track of a disk which is the magnetic recording medium. In the master information carrier, a shape pattern made of a ferromagnetic thin film corresponding to an information signal on the surface of the base member is formed. The master information carrier is adhered to the magnetic recording medium to transfer and record the shape pattern corresponding to the information signal in the master information carrier on the magnetic recording medium as an information signal by an action of magnetization.

To make sure of adhesion, the base member of the master information carrier is sectioned into a high-level region and a low-level region by means of a step so that the shape pattern corresponding to the information signal is formed in the high-level region.

If some foreign matter exists in a high-level region of the master information carrier, uniform adhesion cannot be secured between the high-level region and the magnetic recording medium. Then, the master information carrier is washed. After being washed with a detergent such as pure water or an organic solvent, spin-drying is carried out by means of rotating the master information carrier at a high speed to remove the detergent by centrifugal force.

In such spin-drying, there is observed such a phenomenon that flow of the detergent becomes stagnant at an edge of the high-level region so that minute foreign matter contained in the detergent may stick to the edge. This phenomenon causes a problem if the foreign matter sticks to and resides on the surface of the high-level after washing.

If foreign matter thus sticks and resides, it is impossible to uniformly adhere the high-level region and the magnetic recording medium with each other, thus possibly damaging the surface of the magnetic recording medium or the surface of the high-level region in the master information carrier at adhering.

Therefore, a transferring and recording method of adhering the magnetic recording medium and the high-level region in which a ferromagnetic thin film pattern is formed in the master information carrier has an important subject of preventing detergent or foreign matter from stagnating at an edge of the high-level region during a detergent drying step for the master information carrier, for the purpose of improving the adhesion thereof.

Such a subject applies not only to a magnetic recording medium for magnetically recording/reproducing but also to an information recording medium of any other recording/reproducing types.

SUMMARY OF THE INVENTION

Accordingly, a main object of the present invention is to provide a high-reliability master information carrier which can uniformly adhere a high-level region and an information recording medium without damaging the information recording medium when an information signal such as a preformat information is transfer-wise recorded to the information recording medium such as a magnetic recording medium in a master information carrier.

Another object of the present invention is to provide a method for manufacturing a high-reliability information recording medium.

The invention about the master information carrier solves the above-mentioned problems by taking the following measures. The invention premises a structure of a master information carrier in which a region having a shape pattern corresponding to an information signal on the surface of a base member is provided as a high-level region higher than the other regions. In the master information carrier having this premised structure, a required area of a rising edge which defines the high-level region has such a shape that protrudes externally so as to promote flow of a detergent, e.g., a curved shape which protrude externally convex shape or a polygonal shape consisting of a plurality of straight lines so as to protrude externally convex shape. Such a shape is called a flow promoting shape.

Here, a high-level region on the base member surface refers to a relatively higher region in which an information signal is formed with respect to a relatively lower region (which is called a low-level region) in which an information signal is not formed. Further, the rising edge which defines the high-level region refers to a portion having a step which forms a boundary between the high-level and low-level regions on the base member surface. Further, the required area of the edge refers to an area where a detergent or foreign matter contained therein is liable to stagnate during a drying step after washing.

In short, the master information carrier of the present invention includes a base member, a high-level and low-level regions which are constituted with a step formed therebetween on the surface of the base member, a shape pattern corresponding to an information signal formed on the surface of the high-level region, and a flow promoting portion which is formed in a required area of an edge at a boundary defining the high-level and low-level regions and has a shaped protruding externally so as to promote the flow of a detergent.

The structure of the present invention has the following actions. The area where a detergent or foreign matter is liable to stagnate is the edge of the high-level region which extends perpendicularly or nearly perpendicularly with respect to the flow direction of the detergent. At such an area, smooth flow of the detergent tends to be blocked. Even if the flow of the detergent hits the edge, it is stopped and stagnates there and once it stagnates, the following detergent flow is stopped by this stagnant detergent and may not reach the edge. Then, the stagnated state becomes permanent. This means, in short, stagnation (see detergent-flow stagnating region 54 shown in FIG. 22).

The above-mentioned stagnation is caused, as mentioned above, by a fact that the edge of the high-level region extends perpendicularly or nearly perpendicularly to a flow direction of a detergent. Then, in accordance with the present invention, a required area where a detergent or foreign matter contained therein is liable to stagnate is shaped as the flow promoting portion to protrude externally, i.e. opposite the flow of the detergent so as to promote the flow of the detergent without blocking it. By this protruding shape of the flow promoting portion, the flow of the detergent is promoted.

By such a countermeasure, it is possible to smooth the flow of a detergent at an area (position) where it is liable to be blocked, thereby preventing the detergent from stagnating therein. The detergent can thus be prevented from stagnating and therefore foreign matter contained therein can be prevented from being stagnated.

Here, a master information carrier in accordance with the present invention is reconfirmed as follows. The master information carrier is something like, so called an original text for initially recording an information signal of, e.g., preformat information on an information recording medium and has such a pattern (which is represented by a ferromagnetic thin film pattern) formed therein that corresponds to an information signal such as preformat information. An aspect of the information signal recording from the master information carrier to the information recording medium is transfer-wise. That is, the surface of the master information carrier is contacted with the surface of the information recording medium, thereby recording the information signal to the information recording medium transfer-wise by means of required processing (magnetization of a ferromagnetic thin film pattern in the case of a magnetic recording medium). Most important thing in such transfer-wise recording is to uniformly adhere the master information carrier to the information recording medium. It is important to uniformly contact the master information carrier to the information recording medium at least one region of this carrier in which region the above-mentioned pattern is formed not in the other regions where the pattern is not present. One technique to further effectuate this uniform adhesion is to raise in level the region where the pattern is formed higher than the other regions where the pattern is not formed. That is, the surface of the master information carrier is sectioned into a high-level region and a low-level region so that the pattern is formed in the high-level region. The high-level region has a high possibility than the low-level region of adhering the surface of the information recording medium. The low-level region needs not be adhered since it does not have the pattern formed therein. Such partial adhesion in the high-level region not throughout adhesion enables highly uniform adhesion.

By sectioning the surface of the master information carrier into the high-level and low-level regions, another advantage can be obtained. In a state where the master information carrier is in contact with the information recording medium, there is provided a gap in the low-level region, which gap can be used as a degassing path. Although there is air in the degassing path, by degassing through the path, the low-level region has a negative pressure so that negative-pressure suction may enhance the adhesion between the high-level region and the information recording medium.

No matter whether there is a level difference between the high-level and low-level regions on the surface of a master information carrier, that is, even if the master information carrier is flat throughout on its surface, foreign matter, if any on the surface, may damage the surface of the information recording medium when the master information carrier is contacted with it. Then, it is important to surely remove foreign matter which may possibly be on the surface of the master information carrier beforehand. The foreign matter may typically be removed by washing the master information carrier using a detergent such as pure water or an organic solvent. After washing, it is dried.

At a time of washing and drying the master information carrier, there is involved a problem of an irregularity between the high-level and low-level regions on the surface thereof. Although the section between the high-level and low-level regions forming the irregularity is, as mentioned above, effective in improving the uniform adhesion of the master information carrier to the information recording medium, this irregularity caused by thus sectioned high-level and low-level regions presents a problem in washing and drying for removing of the foreign matter. That is, a step boundary between the high-level and low-level regions, i.e. an edge acts as a weir that blocks the flow of a detergent.

At the edge thus acting as a weir, the detergent is liable to stagnate, and foreign matter contained therein is also liable to stagnate. After drying, the foreign matter remains as stuck there. Most of the foreign matter is removed for sure since the carrier is washed. However, a meager part of foreign matter resides as stuck there. This foreign matter stuck and residing on the master information carrier, even if only a little, may damage the surface of the information recording medium when the master information carrier is adhered with it, causing a significant problem. There is also another significant problem that the stuck and residing foreign matter may deteriorate the uniform adhesion of the master information carrier to the information recording medium.

The present invention has had such a background. As mentioned above, in accordance with the present invention, a required area where a detergent or foreign matter contained therein is liable to stagnate would protrude externally in a curved or polygonal convex shape so as not to block the flow of the detergent toward the area, i.e. such a flow promoting shape that inflates toward the outside. Such a shape serves to smooth the flow of the detergent and prevents the detergent and also foreign matter contained therein from stagnating at the area. Therefore, it is possible to eliminate the sticking and residing of foreign matter also at the edge, which is the boundary between the high-level and low-level regions, thereby realizing high-level cleaning throughout on the surfaces of the master information carrier.

As a result, in a master information carrier of such a structure that a high-level region is supposed to have such a pattern (which is represented by a ferromagnetic thin film pattern) formed therein that corresponds to an information signal and also that partial tight contact caused by an irregular shape of that region is combined with negative-pressure suction due to degassing thereof to enhance uniform adhesion with an information recording medium in order to transfer and record the information signal from the high-level region to the information recording medium, the present invention enables completely removing foreign matter, thereby effectuating the uniform adhesion truly. Moreover, it is made possible simply by controlling the required area into an inflated curved or polygonal shape eliminating complicated and expensive devices, thereby giving a great advantage.

The curved shape of the inner radial edge of the high-level region may be any one of an arc, part of an ellipse, a parabola, a hyperbola, any other quadratic curve, and any combination thereof. The polygonal shape may also be any one of a wedge and any polygon consisting of a plurality of straight lines externally protruding convex shape as far as the number of these lines is two or larger and no matter whether an angle between any two adjacent ones of these lines may be an acute, right, or obtuse angle.

Preferred aspects of a master information carrier of the present invention will be comprehensively described below.

In the above description, the preferred aspect may have the flow promoting shape formed at an inner radial edge near the center of the base member.

Here, the master information carrier and the information recording medium are assumed to be disk shape. In the disk-shaped information recording medium, a pattern which corresponds to an information signal such as of preformat information is formed in a region taken along in an approximately radial direction of the disk. For the purpose of drying a detergent, spin-drying is mainly employed by use of a centrifugal force. At this time, the detergent or foreign matter contained therein is liable to stagnate at the inner radial edge of the high-level region since the edge has a relatively small centrifugal force ($F=r\omega^2$), which is proportional to the radius. Then, the inner radial edge of the high-level region is transformed into a flow promoting shape, thereby inhibiting possible stagnation to smooth the flow of the detergent, and preventing the detergent and foreign matter contained therein from sticking and residing.

Further, in the above description, the preferred aspect is that the curved shape according to the flow promoting shape portion has a arc shape. The arc shape relatively simple shape and easy to form, so that the present invention is advantageous in development.

In the above description, the preferred aspect is that the polygonal shape according to the flow promoting shape portion has a wedge shape. The wedge shape is relatively simple shape and easy to form and excellent in smoothing the flow of the detergent, so that the present invention is advantageous in development.

In any case of the curved and polygonal shapes, the preferred aspect is that the base member is made of a nonmagnetic material and the pattern formed in the high-level region is a thin film pattern made of a ferromagnetic material. This permits not only a flexible disk but also a hard disk to properly record thereon an information signal such as of preformat information transfer-wise.

In addition, in the above description, the preferred aspect is that the base member has a disk shape and a plurality of the high-level regions is formed in a state approximately taken along in a radial direction of the disk-shaped base member with the low-level region being inserted between each two regions thereof which are adjacent to each other in a circumferential direction.

In the disk-shaped information recording medium, in units of a sector obtained by subdividing the disk at a predetermined angle pitch, preformat information signals such as a tracking servo signal, an address information signal, and a reproduction clock signal are previously recorded in the circumferential direction. There is the information recording medium having a form in which those preformat information signals are arranged in an approximately radial direction (in a radius direction). This structure corresponds to that of a recording/reproducing head moves in the radius direction of the information recording medium. When the head actuator is of a rotary type like a magnetic disk, the recording/reproducing head traces an arc-like approximately taken along in the radial direction of the information recording medium. If the head actuator is of a direct-acting type like a mini-disk (MD), on the other hand, the recording/reproducing head traces a straight line approximately taken along in the radial direction of the information recording medium.

Corresponding to such an array of the preformat information signals in the information recording medium, the information signal patterns are also arrayed radially on a master information carrier. In accordance with the present invention, the information signal patterns are formed on the high-level region while a plurality of the high-level regions are radially formed. Between each two of these high-level regions which are adjacent to each other circumferentially, a low-level region is inserted. As a result, the low-level regions are also arrayed radially.

In the plurality of high-level regions thus arrayed radially, the respective inner radial edge protrudes externally in a curved shape or in a convex shape of a polygon consisting of a plurality of straight lines. That is, the edge is shaped so as to promote the flow.

Since the inner radial edge is thus shaped into the flow promoting portion, when the disk-shaped master information carrier is washed, as mentioned above, it is possible to smooth the flow of a detergent used to prevent the detergent and foreign matter contained therein from stagnating at the edge, thereby realizing sophisticated and clean washing. Also, each of the plurality of high-level regions is radially elongated and has a low-level region on both sides thereof, thus enabling highly adhesion of the high-level region, in which the information signal pattern is formed, of the master information carrier to the information recording medium. Further, each of the radial low-level region interconnects the center of the disk-shaped base member and the outer periphery, so that uniform adhesion can be improved between the information recording medium and the master information carrier by means of a negative pressure brought about by vacuum-sucking the low-level region through the degassing path.

By a synergetic effect of those three actions (partial adhesion, negative-pressure suction, flow promoting shape), it is possible to high accurately record an information signal pattern transfer-wise to an information recording medium at a disk-shaped master information carrier, i.e. a high-level region.

The present invention also relates to a method for manufacturing the information recording medium.

The manufacturing method of the information recording medium according to the present invention manufactures the information recording medium by using the master information carrier having any aspects described above. That is, first a step is performed for superposing any one of the above-mentioned master information carriers which has an information signal pattern formed on the surface of a high-level region of a base member and also which has a flow promoting shape at a required area of an edge of the high-level region onto an information recording medium with the information signal pattern as adhered and then another step is performed for transferring and recording the information signal pattern on the master information carrier onto the information recording medium as an information signal.

Here, it is assumed that the information recording medium may be a magnetic recording medium such as a hard disk, a magneto-optical recording medium such as a mini-disk (MD), or an optical recording medium such as a DVD (Digital Versatile Disk).

In the case of manufacturing the information recording medium using a master information carrier having a flow promoting shape at a high-level region in which the information signal pattern is formed, the master information carrier is already cleared of foreign matter substantially completely and highly clean and the high-level region is also partially adhered and the low-level region is degassed, so that it is possible to transfer and record the information signal pattern at a high accuracy and also to manufacture the information recording medium free of foreign matter.

In the above description, if the information recording medium is a magnetic recording medium, the following aspect may be preferable. That is, the base member is nonmagnetic and an information signal pattern formed in a high-level region of the nonmagnetic base member uses the master information carrier constituted of the shape pattern of a ferromagnetic thin film. Further, such a magnetic recording medium may be used that a magnetic recording layer made of a ferromagnetic thin film is formed on the surface of the nonmagnetic base member.

Then, in the case that the master information carrier is superposed on the magnetic recording medium in an adhesion state and the information signal pattern on the master information carrier is magnetically transferred and recorded on the information recording medium, a ferromagnetic thin film corresponding to the information signal pattern is magnetized by applying an external magnetic field, so that the information signal pattern is transferred and recorded as a magnetized pattern on a magnetic recording layer of the magnetic recording medium by a leakage flux from the ferromagnetic thin film.

Alternatively, prior to the superposition of the adhesion state, a first external magnetic field is applied on said information recording medium to initially magnetize said magnetic recording layer of said information recording medium and subsequently at time of said adhesive superposition, a second external magnetic field having a polarity opposite to that of said first external magnetic field is applied to transfer and record said information signal pattern as a magnetization pattern onto said magnetic recording layer of said magnetic recording medium.

As mentioned above, in the case that the magnetic recording medium is manufactured by using the master information carrier having the flow promoting shape on the high-level region in which the information signal pattern is formed, since the master information signal pattern is highly cleaned by substantially and fully removing the foreign matter, and the high-level region is partially contacted tightly and the low-level region is degassed, so that the transferring and recording of the information signal pattern is performed at a high accuracy and the magnetic recording medium without adhering the foreign matter can be manufactured.

BRIEF DESCRIPTION OF THE DRAWINGS

The above and other objects, advantages, features, and uses of the invention will become apparent from the following description of preferred embodiments of the invention with reference to the accompanying drawings, wherein:

FIG. 2 is a structure diagram for showing one example of a ferromagnetic thin film pattern corresponding to a preformat information signal formed on a surface of the master information carrier according to the first embodiment of the present invention;

FIG. 4 is an expanded perspective view for showing a situation in which stagnation of a detergent is inhibited in the master information carrier according to the first embodiment of the present invention;

In all these Figures, like components are indicated by the same reference numerals.

DETAILED DESCRIPTION OF THE PREFERRED EMBODIMENTS

Preferred embodiments of a master information carrier related to the present invention will be described below with reference to the drawings.

First Embodiment

Figure 1A:
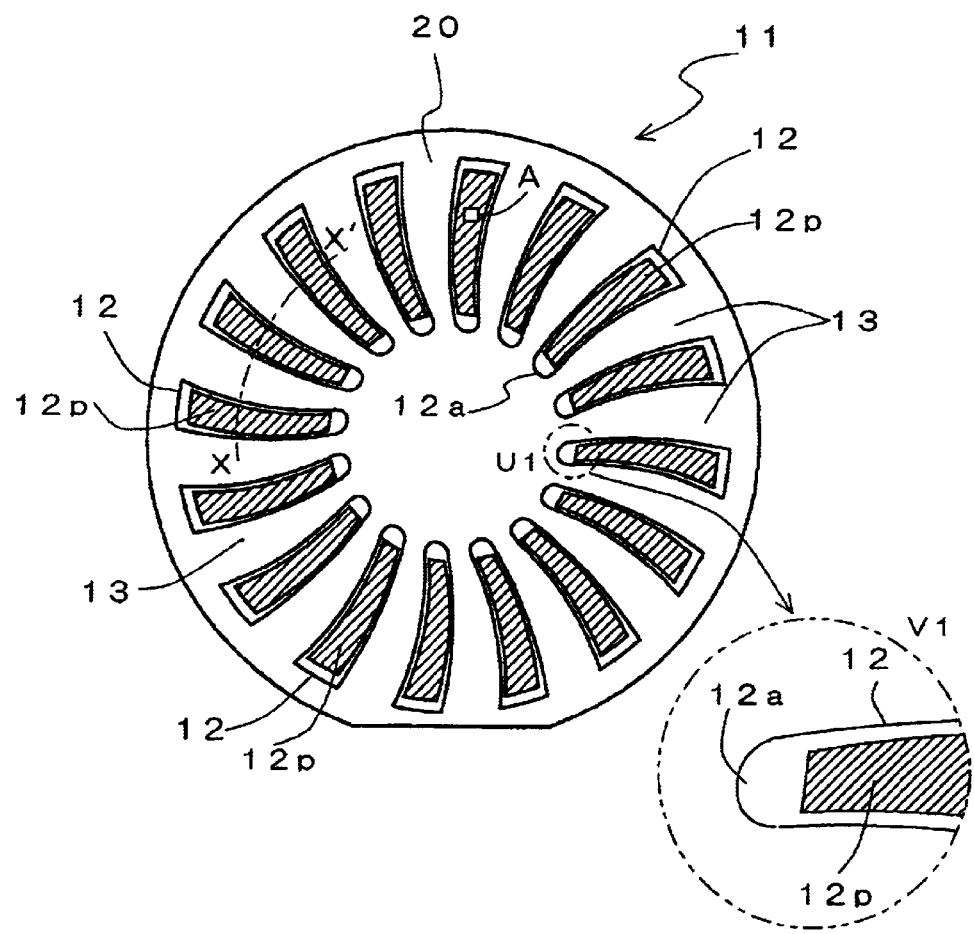
FIG. 1A is a plan view for schematically showing a structure of a master information carrier according to a first embodiment of the present invention.
Figure 1B:
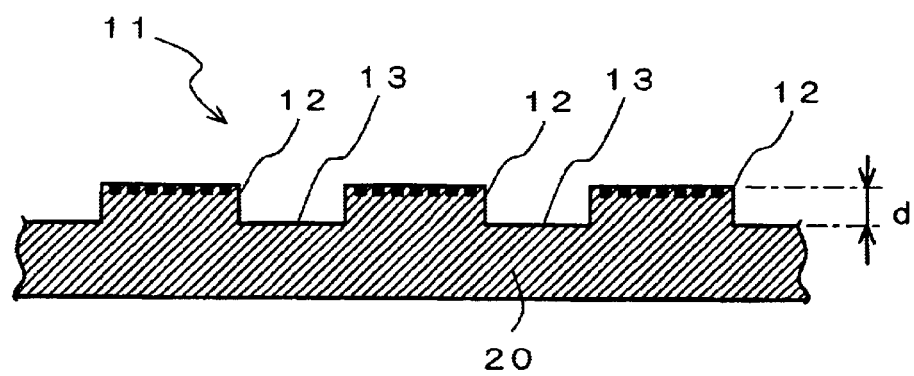
FIG. 1B is a cross-sectional view taken along a line X-X' of FIG. 1A.

A structure of a master information carrier according to a first embodiment of the present invention is shown in FIGS. 1A and 1B. FIG. 1A is a plan view of the master information carrier, in which a display area V1 indicates an expanded main portion U1. As shown in FIG. 1A, on a surface of a disk-shaped master information carrier 11, elongated regions 12 along in an approximately radial direction in which a fine ferromagnetic thin film pattern 12p corresponding to a preformat information signal (hatched region) is formed is provided along in a circumferential direction at a predetermined angle pitch. An expanded cross-sectional view of a master information carrier 11 taken along dash-and-dot line X-X' of FIG. 1A is shown in FIG. 1B. As shown in FIG. 1B, a region 13 (non-pattern-forming region) in which the ferromagnetic thin film pattern is not formed is set lower in surface level than a region 12 (pattern-forming region) in which the ferromagnetic thin film pattern 12p is formed. The region 12 with a higher surface level is called a high-level region and the region 13 with a lower surface level, a low-level region. The high-level region 12 and the low-level region 13 are formed in a nonmagnetic base member 20.

In this first embodiment of the present invention, such an end 12a of the rising ends defining the high-level pattern-forming region 12 from the non-pattern forming low-level region 13 that is on the inner radial direction side of the master information carrier 11 is formed into a convex shape protruding externally (toward inner radial direction side), specifically into an arc-shaped flow promoting. Hereinafter, this flow promoting shape is indicated by a reference numeral 12a.

Note here that the illustrations in FIGS. 1A and 1B are simplified (deformed) for convenience in description; for example, the indicated dimensions and the number of the regions in which the ferromagnetic thin film pattern 12p is formed are different from those of an actual master information carrier. Actually, for example, the high-level region 12 is provided as many as 100 to 300.

An expanded part of a region A of the high-level region 12 shown in FIG. 1A is shown in FIG. 2. As shown in FIG. 2, ferromagnetic thin film patterns are sequentially arrayed corresponding to a tracking servo signal St, an address information signal Sa, and a reproduction clock signal Sc in this order. In FIG. 2, a hatched portion corresponds to the thin film pattern portion made of a ferromagnetic material such as Co (cobalt).

A method of forming on the surface of the master information carrier 11 a fine ferromagnetic thin film pattern corresponding to a preformat information signal consisting of those tracking servo signal, address information signal, and reproduction clock signal will be described with reference to FIG. 3 as follows.

Figure 3A:
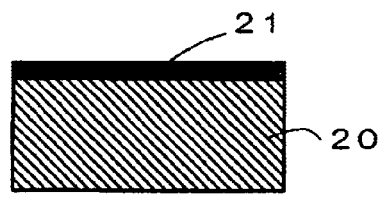
FIG. 3A is a cross-sectional view for showing one step of a method for manufacturing the master information carrier according to the first embodiment of the present invention.

First, as shown in FIG. 3A, a ferromagnetic thin film 21 made of Co and the like is formed by sputtering on the surface of a nonmagnetic base member 20 such as a glass and a silicon wafer with a low surface roughness and a high flatness.

Figure 3B:
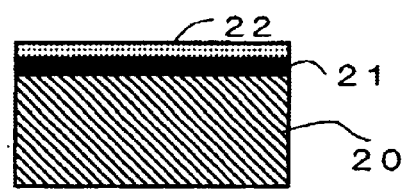
FIG. 3B is a cross-sectional view for showing a subsequent step.
Figure 3C:
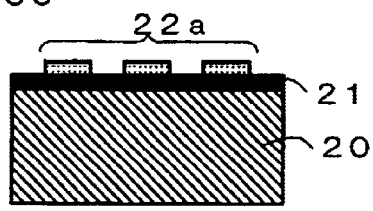
FIG. 3C is a cross-sectional view for showing a further subsequent step.
Figure 3D:
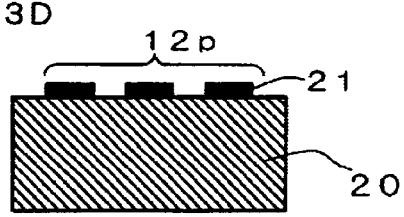
FIG. 3D is a cross-sectional view for showing a further subsequent step.

Next, as shown in FIG. 3B, a resist layer 22 is formed on the ferromagnetic thin film 21 formed on the surface of the nonmagnetic base member 20 and then, as shown in FIG. 3C, using photolithography or electron beam lithography, the resist later 22 is exposed and developed to perform patterning 22a. After that, as shown in FIG. 3D, by dry etching and the like, the ferromagnetic thin film pattern 12p is formed.

In this case, the method for forming the ferromagnetic thin film pattern 12p on the surface of the nonmagnetic base member 20 is not limited to sputtering but may be vacuum evaporation, ion plating, CVD (Chemical Vapor Deposition), plating, and other typical thin film forming methods. Further, the material of the ferromagnetic thin film 21 is not limited to Co but may be any one of various kinds of magnetic materials no matter whether it is a hard, semi-hard, or soft magnetic material as far as it enables transferring recording a digital information signal on the magnetic recording medium. For example, Fe, Co, and a Fe—Co alloy may be used. To generate a sufficiently strong recording magnetic field regardless of the type of the magnetic recording medium on which a preformat information signal is to be recorded, preferably the saturation magnetic flux density of the magnetic material should be possibly larger. Especially for a hard disk having a high coercive force in excess of 2000 Oe (159 kA/m) or a flexible disk with a large thickness of the magnetic recording layer, it may be impossible to record data sufficiently if the saturation magnetic flux density is not more than 0.8 T, so that such a magnetic material that has not less than 0.8 T, preferably not less than 1.0 T, is used.

Further, the film thickness of the ferromagnetic thin film pattern 12p, which depends on the bit length, the saturation magnetization, and the film thickness of the magnetic recording layer, may only need to be approximately 50 to 500 nm if the bit length is approximately 1 µm, the saturation magnetization is approximately 500 emu/cc (500 kA/m), and the thickness of the magnetic recording layer is approximately 20 nm.

As described above, as shown in FIG. 3D, the ferromagnetic thin film pattern 12p is formed on the nonmagnetic base member 20, which is followed by steps of forming the high-level region 12 and the low-level region 13 and a step of transforming an edge 12a of the high-level region 12 into a smooth curved shape as described below.

Figure 3E:
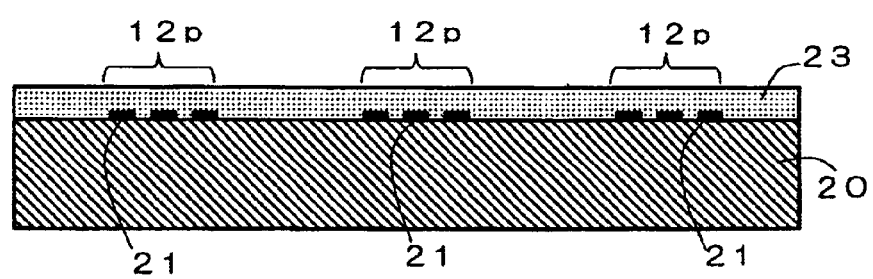
FIG. 3E is a cross-sectional view for showing a further subsequent step.
Figure 3F:
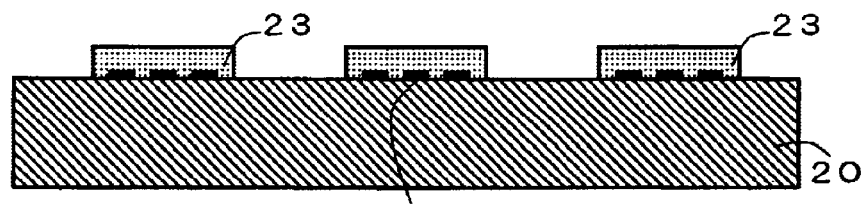
FIG. 3F is a cross-sectional view for showing a further subsequent step.
Figure 3G:
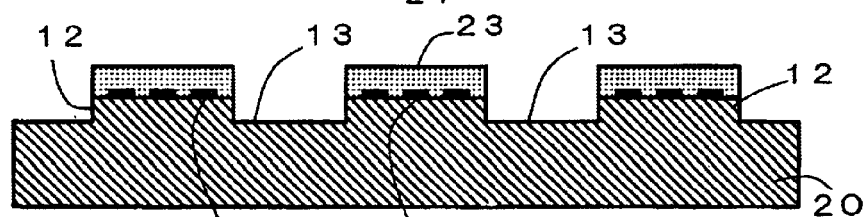
FIG. 3G is a cross-sectional view for showing a further subsequent step.
Figure 3H:
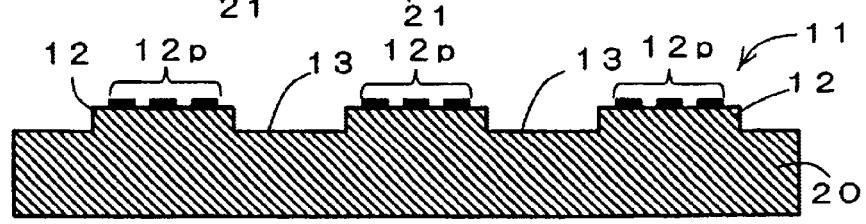
FIG. 3H is a cross-sectional view for showing a further subsequent step.

First, as shown in FIG. 3E, a resist layer 23 is formed on the nonmagnetic base member 20 on which the ferromagnetic thin film pattern 12p is formed and then, as shown in FIG. 3F, using photolithography and the like, the resist layer 23 covered only in a region of the ferromagnetic thin film pattern 12p. Next, as shown in FIG. 3G, in a region where the resist layer 23 is removed, a low-level region 12 lower in surface level than the high-level region 12 is formed by dry etching and the like. After that, as shown in FIG. 3H, the residual resist layer is removed by a liquid chemical. In this way, such a master information carrier 11 is obtained that the high-level region 12 in which the ferromagnetic thin film pattern 12p is formed and the non-pattern-forming low-level region 13 are formed on the nonmagnetic base member 20.

As a result of intense discussion of the inventors, it has been found that if a level difference d (see FIG. 1B) between the surface of the high-level region 12 and that of the low-level region 13 is at least 3 µm, it is possible to uniformly adhere the ferromagnetic thin film pattern 12p with the magnetic recording medium. More preferably level difference d is 10 to 20 µm. The level difference d can be set at a predetermined value by appropriately selecting the ion etching conditions.

By transforming the resist layer 23 into a smooth curved shape which externally protrudes in a convex manner (toward inner radial side), specifically into an arc shape in a direction of the radius of the disk-shaped nonmagnetic base member 20 in a step of FIG. 3F for covering only the region of the ferromagnetic thin film pattern 12p with the resist layer 23 using photolithography, it is possible to form the arc shaped flow promoting shape 12a at the edge of the high-level region 12.

If an foreign matter and the like exists on the high-level region 12 of the master information carrier 11, the high-level region 12 may not be uniformly adhered with the magnetic recording medium. Then, the master information carrier 11 needs to be washed.

The master information carrier 11 may be washed by a general method, for example, a scrubbing method of scrubbing the master information carrier 11 with a brush or sponge to remove foreign matter or an ultrasonic-wave washing method of dipping the master information carrier 11 into pure water or a chemical such as an organic solvent to remove the foreign matter.

After the master information carrier 11 is washed by such a washing method, master information carrier 11 needs to be dried and cleared of the detergent. After being washed, the master information carrier may be dried by a spin drying method of rotating it at a high speed to remove together with the foreign matter the detergent stuck to the surface thereof.

During the step of drying the master information carrier 11 and removing the detergent from it, minute foreign matter contained in the detergent may possibly reside at the inner radial edge of the high-level region 12, to guard against which this edge can be transformed into the smooth curved flow promoting shape 12a of, e.g. an arch shape, which protrudes externally, thereby inhibiting the residing of the detergent as much as possible.

FIG. 4 is an expanded perspective view for showing a state of an main portion where the residing of the detergent is inhibited. In a hatched region within the high-level region 12 which protrudes in a normal direction with respect to the low-level region 13 is formed the ferromagnetic thin film pattern 12p, which is a shape pattern of the preformat information signal. The inner radial end of the high-level region 12 provides the smooth curved flow promoting shaped portion 12a. Flow 14 is indicated by a broken line.

In spin drying, the flow 14 of a detergent occurs on the surface of the low-level region 13 toward the outside of a radial direction from the center of the disk-shaped master information carrier 11. This flow 14 of the detergent passes with a less resistance through the radial-shaped low-level region 13 between the high-level regions 12. Although the flow 14 which may hit the high-level region 12 first hits the flow promoting portion 12a of the inner radial edge, this flow promoting shape portion 12a is smooth curved shape, so that as shown in FIG. 4, it flows smoothly without stagnation. Therefore, it is possible to surely inhibit the occurrence of a detergent stagnated portion 54 such as shown in the comparison example of FIG. 22.

Here, the comparative example will be described below with reference to FIGS. 20 to 22.

Figure 20A:
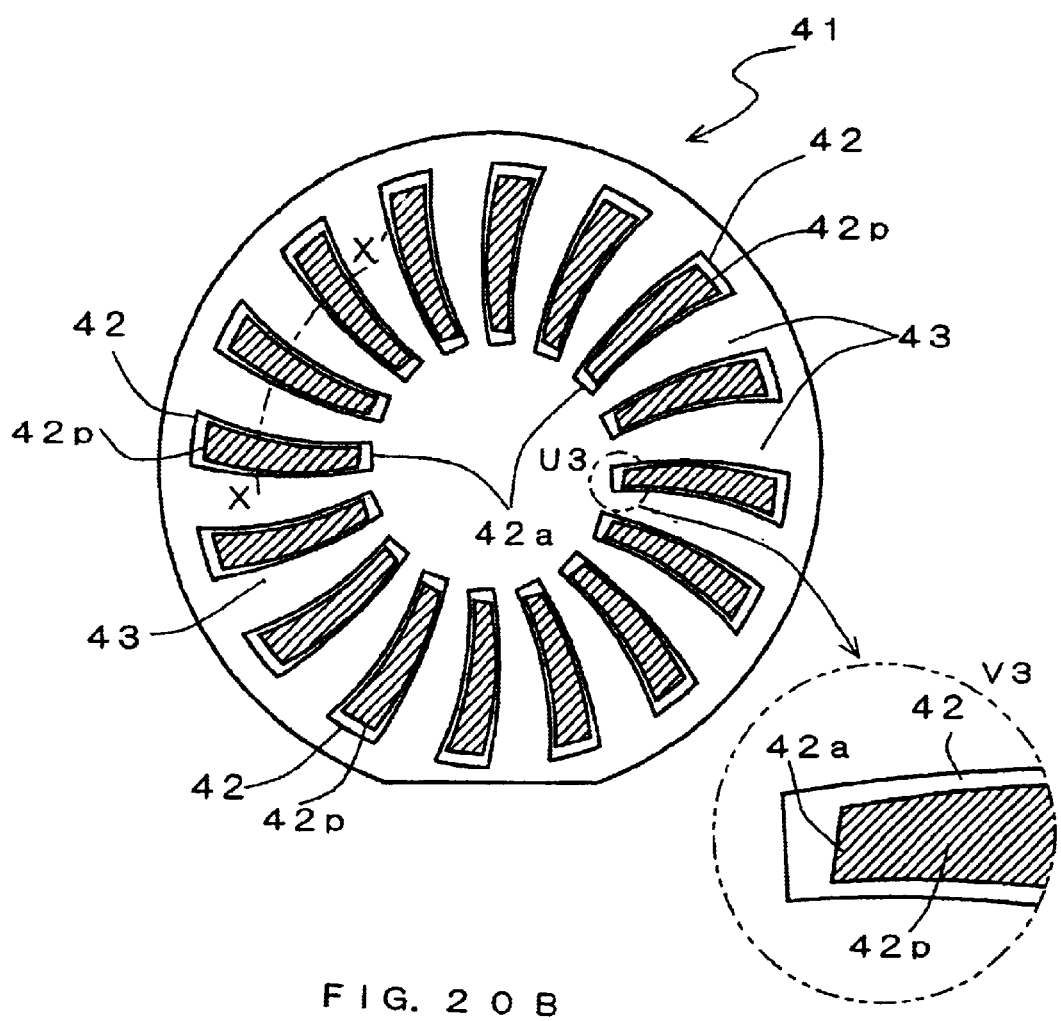
FIG. 20A is a plan view for schematically showing a structure of the master information carrier according to a comparative example.
Figure 20B:
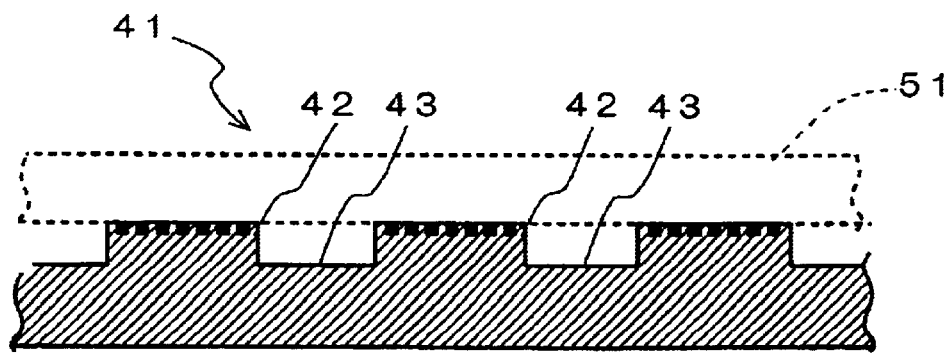
FIG. 20B is a cross-sectional view taken along a line X-X' of FIG. 20A.

FIG. 20A is a plan view of the master information carrier of the comparative example, in which a display region V3 indicates an expanded main portion U3. FIG. 20B is an expanded cross-sectional view taken along circumferential a dash-and-dot line X-X' of FIG. 20A. In a master information carrier 41 shown in FIG. 20A, there is a level difference between a high-level region 42 and a low-level region 43, in which high-level region 42 is formed a ferromagnetic thin film pattern 42p (hatched region) which corresponds to the preformat information signal.

In the case of recording the preformat information signal on the magnetic recording medium using the master information carrier 41 having such an irregularity in its surface, the gap between the low-level region 43 and a magnetic recording medium 51 indicated by a broken line in FIG. 20B is degassed to provide a negative pressure so that the resultant negative pressure suction and an atmospheric pressure are utilized to uniformly adhere the high-level region 42 and the magnetic recording medium 51 with each other. In this adhesion state, an external magnetic field is applied, thereby transfer-wise recording the preformat information signal corresponding to the ferromagnetic thin film pattern on the magnetic recording layer of the magnetic recording medium 51.

Figure 21:
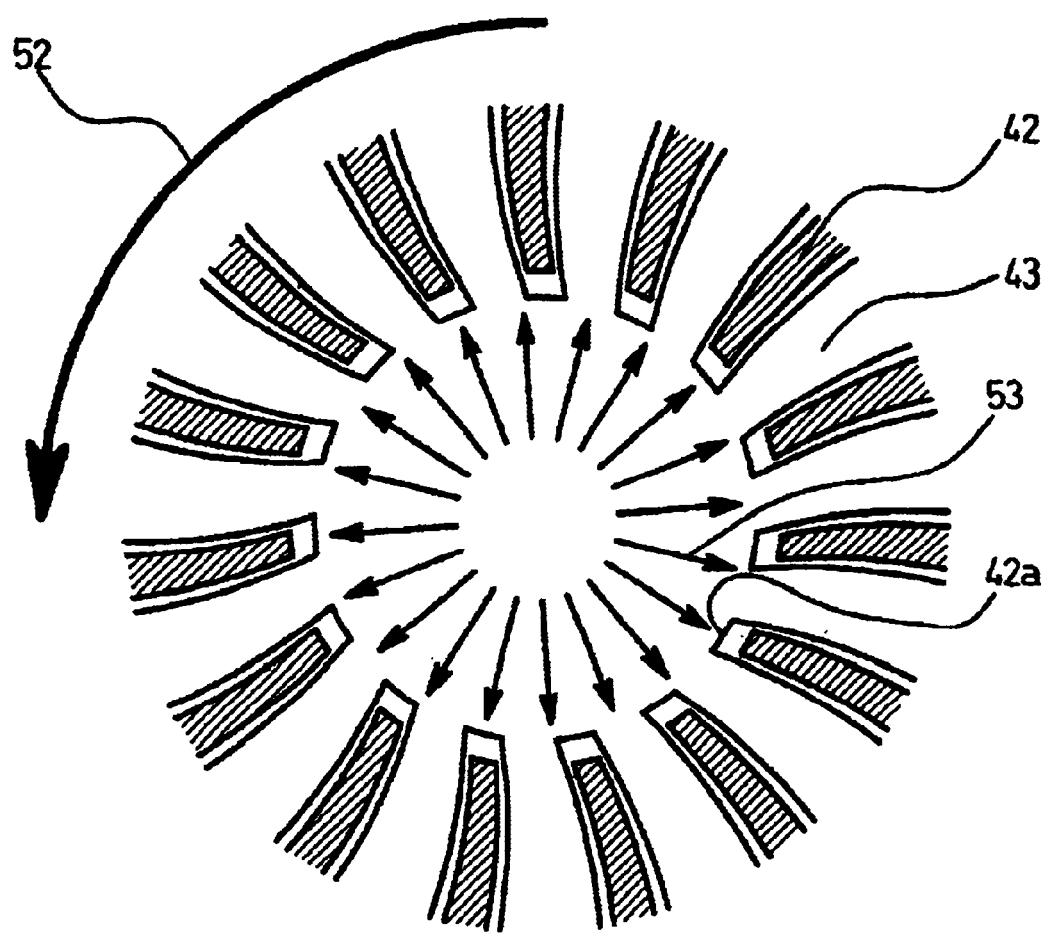
FIG. 21 is a plan view for schematically showing a flow of a detergent when the master information carrier according to the comparative example is dried by spinning.

FIG. 21 schematically shows flow of a detergent when the master information carrier 41 having the detergent stuck thereto is spin-dried. When the master information carrier 41 is rotated at a high speed in a direction of an arrow 52, the detergent present at the center of the master information carrier 41 moves in the radial direction as indicated by an arrow 53 by a centrifugal force.

However, since the high-level region 42 and the low-level region 43 are formed in the master information carrier 41, it is difficult for the detergent to move toward an outer periphery of the master information carrier 41 at a inner radial edge 42a near the center of the master information carrier 41 in the high-level region 42. This is because that the edge 42a is approximately perpendicular or near perpendicular with respect to a direction of the flow of the detergent. Therefore, minute foreign matter contained in the detergent is liable to stagnate at the edge 42a.

Figure 22:
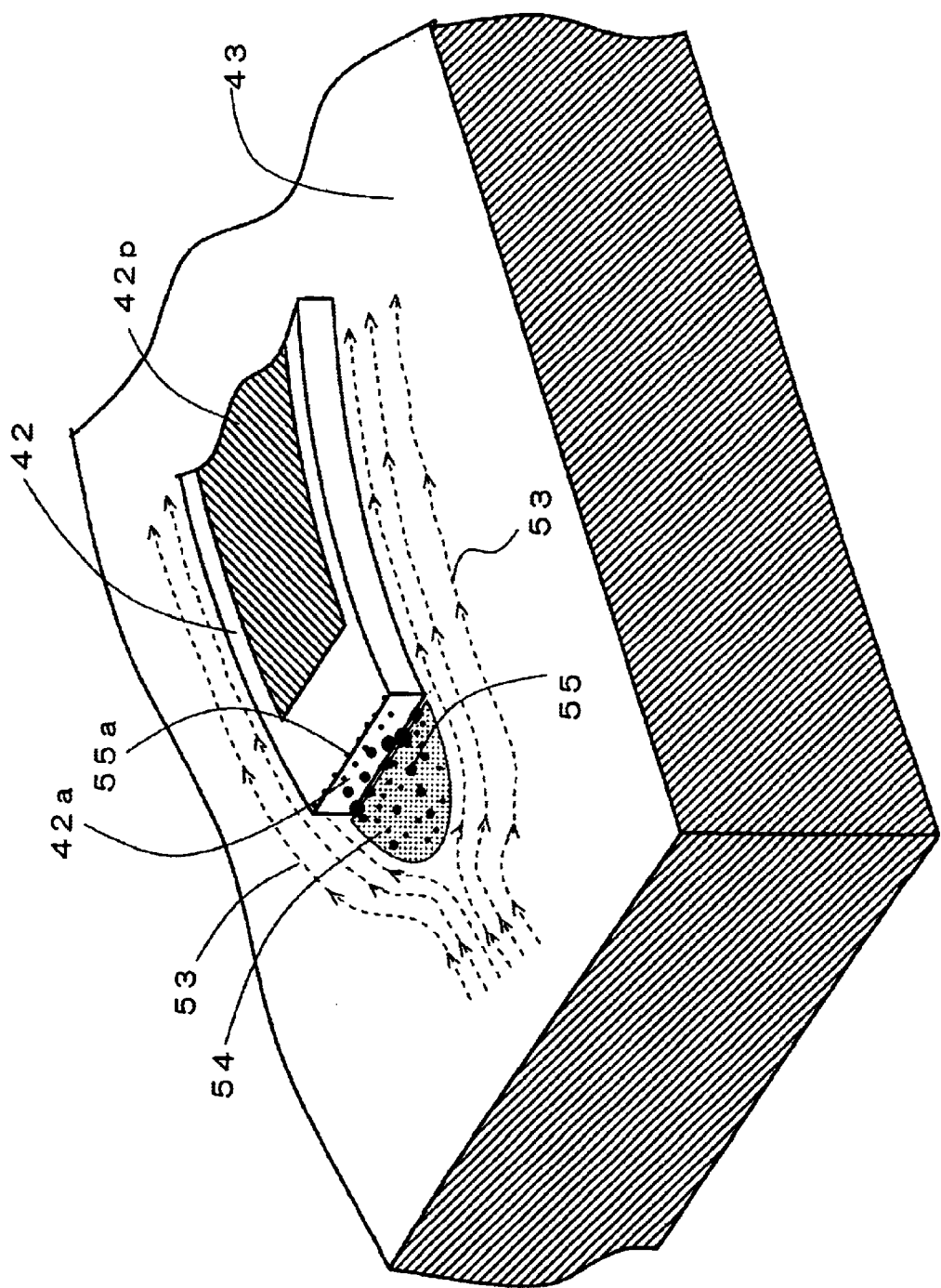
FIG. 22 is an expanded perspective view of a main portion for showing a situation in which a detergent stagnates and foreign matter sticks in the master information carrier according to the comparative example.

FIG. 22 shows the stagnation of the foreign matter. In front (inner radial side) of the edge 42a approximately perpendicular to the high-level region 42, a stagnation region 54 occurs in flow 53 of the detergent in the low-level region 43, in which region 54 stagnates foreign matter 55. Of thus stagnating foreign matter 55, foreign matter 55a stuck and residing on the surface of the high-level region 42 is especially problematical. Any foreign matter stuck and residing may make it impossible to provide uniform adhesion between the high-level region 42 and the magnetic recording medium 51 or may damage the surface of the magnetic recording medium 51 at the time of adhering or the surface of the high-level region 42 in the master information carrier 41.

Accordingly, during drying to remove a detergent, it is important to take care not to leave the detergent or foreign matter at the edge of the high-level region in such a master information carrier that has the high-level and low-level regions.

In the master information carrier 11 having the flow promoting shape 12a according to the first embodiment of the present invention, as described with reference to FIG. 4, an amount of stagnation of the detergent can be minimized, thereby inhibiting sticking of foreign matter during the washing step as much as possible. As a result, the high-reliability master information carrier 11 can be provided.

Accordingly, in a subsequent step of magnetically transferring the preformat information signal from the master information carrier 11 onto the magnetic recording medium, it is possible to provide uniform adhesion at a high accuracy between the ferromagnetic thin film pattern 12p of the high-level region 12 and the magnetic recording layer of the magnetic recording medium. As a result, a high-reliability magnetic recording medium can be provided.

Figure 5:
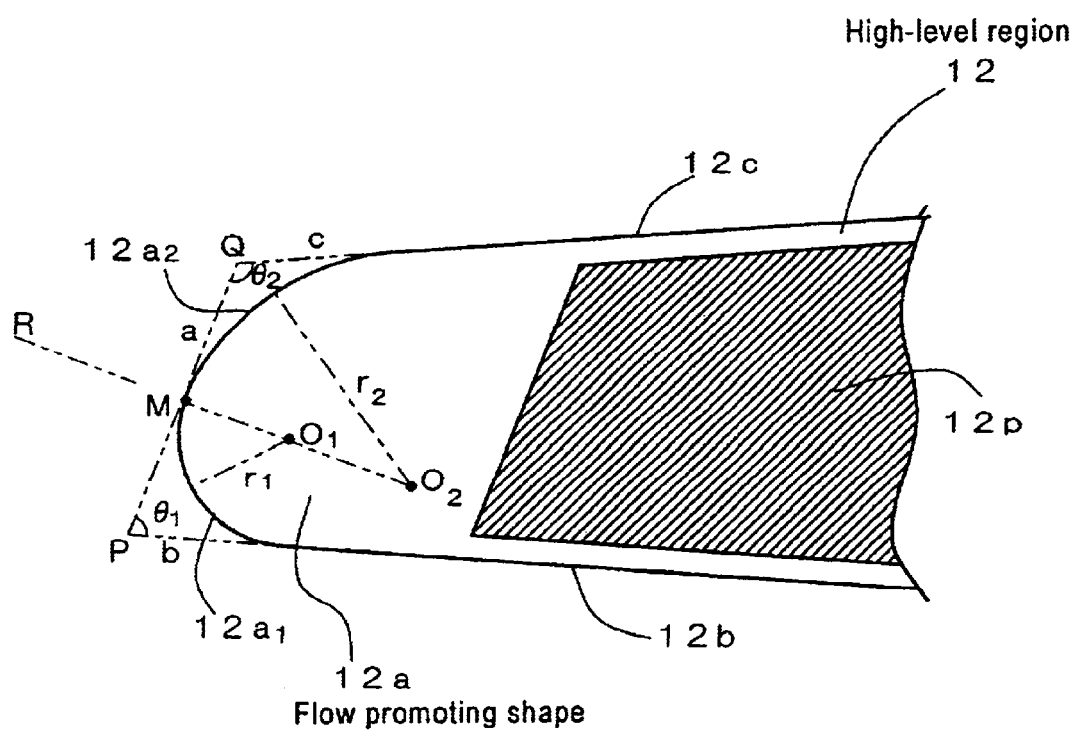
FIG. 5 is an expanded plan view for showing one example of a specific shape of a flow promoting shape in a high-level region of the master information carrier according to the first embodiment of the present invention.

FIG. 5 shows one example of a specific shape of the flow promoting shape portion 12a in the high-level region 12. A dash-and-two-dots line a is straight along a tangent of an arc around the center of the disk-shaped master information carrier 11. R indicates a radial direction ($a^{195}R$) of the disk-shaped master information carrier 11. Dash-and-two-dots lines b and c indicate extended lines of both sides 12b and 12c respectively in a radical direction of the high-level region 12. P and Q indicate intersections between the dash-and-two-dots line a and dash-and-two-dots lines b and c. M indicates a middle point of a segment PQ. A partial arc $12a_1$ having tangents a and b is indicated in a state that it has a center $O_1$ and a radius $r_1$ and goes through the middle point M and is tangent to the dash-and-two-dots line b. Further, a partial arc $12a_2$ is indicated in a state that it has a center $O_2$ and a radius $r_2$ and goes through the middle point M and is tangent to the dash-and-two-dots line c. Here, $r_1 < r_2$. Note here that the middle point M and the centers $O_1$ and $O_2$ are on the same line.

A ratio of $r_1$ to $r_2$ is arbitrary but practically is 1.5 to 4.0 preferably. More preferably, it is 2.0 to 3.0. Angles $\theta_1$ and $\theta_2$ have a relationship of $\theta_1 + \theta_2 \geq 180°$ but may be arbitrary. Idealistically, segments $O_1M$ and $O_2M$ are on the same line but may not be so.

In this case, the shape of the flow promoting portion 12a at the inner radial edge may be, besides an arch, any of part of an ellipse, a parabola, a hyperbola, other quadratic curves, or any combination thereof as far as it is a smooth curved shape.

Figure 6A:
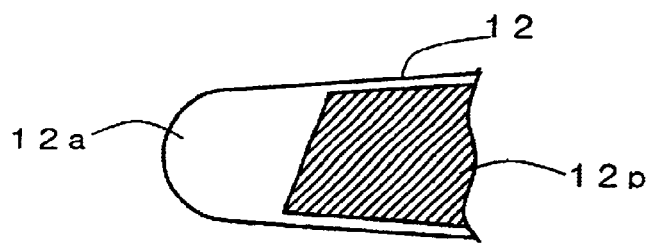
FIG. 6A is a schematic plan view for showing a deformation of the flow promoting shape according to the first embodiment of the present invention.
Figure 6B:
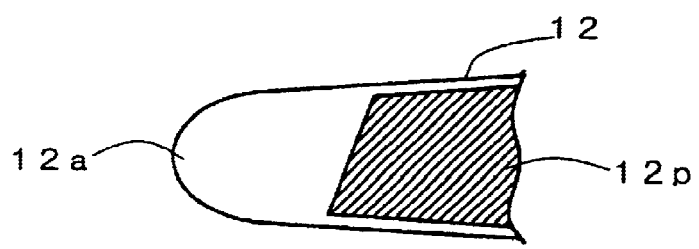
FIG. 6B is a schematic plan view for showing another deformation of the flow promoting shape.
Figure 6C:
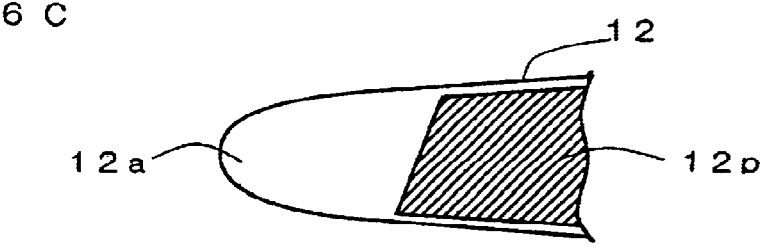
FIG. 6C is a schematic plan view for showing further another deformation of the flow promoting shape.

In an example shown in FIG. 6A, the flow promoting shape 12a is made of part of one arc. In an example shown in FIG. 6B, it is made of part of an ellipse arc. In an example shown in FIG. 6C, it is made of a parabola.

Figure 6D:
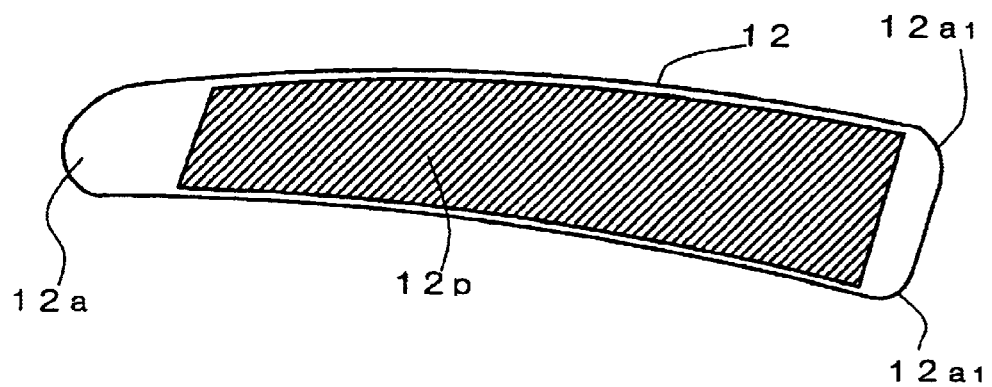
FIG. 6D is a schematic plan view for showing further another deformation of the flow promoting shape.

The position of the flow promoting shape is not necessarily limited to an inner radial edge but may be any other edge. In an example shown in FIG. 6D, two corners of the outer radial edge have a shape of the flow promoting portion $12a_1$ which is rounded for chamfering. The corner, at which a stagnant eddy is liable to occur in the flow of the detergent, can be rounded to inhibit the occurrence of an eddy, thereby preventing foreign matter from sticking and residing at the edge.

Second Embodiment

Figure 7A:
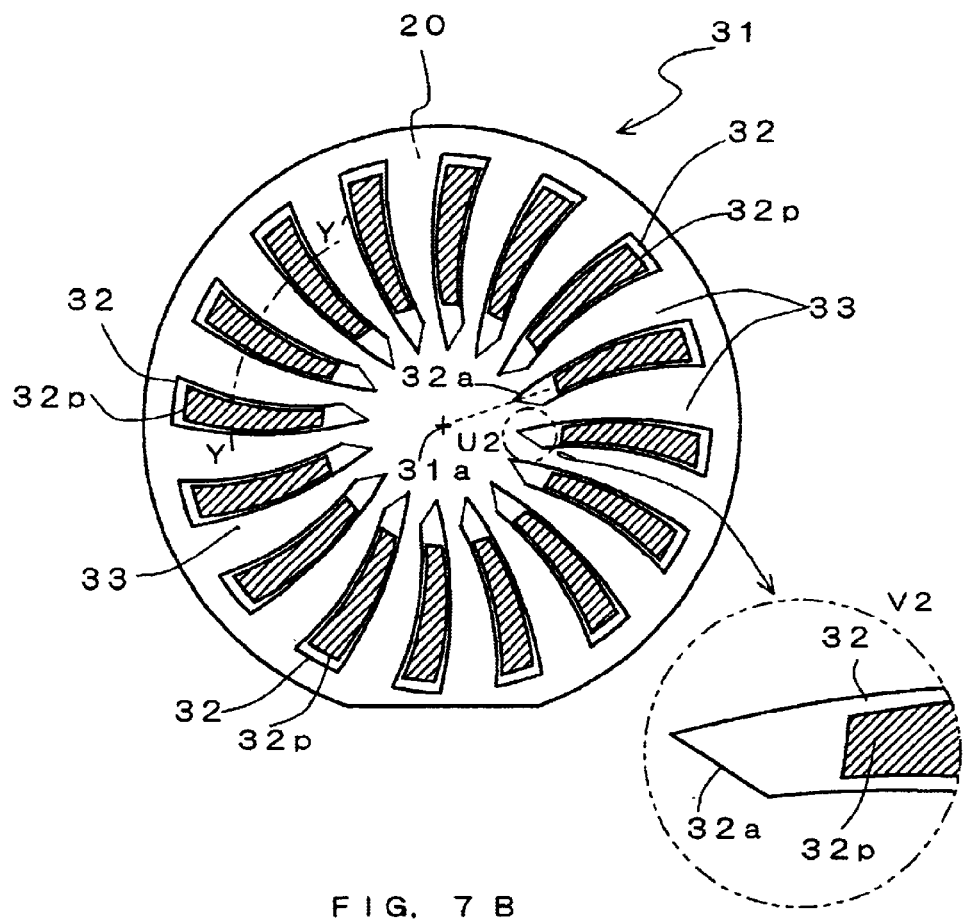
FIG. 7A is a plan view for schematically showing a structure of the master information carrier according to a second embodiment of the present invention.
Figure 7B:
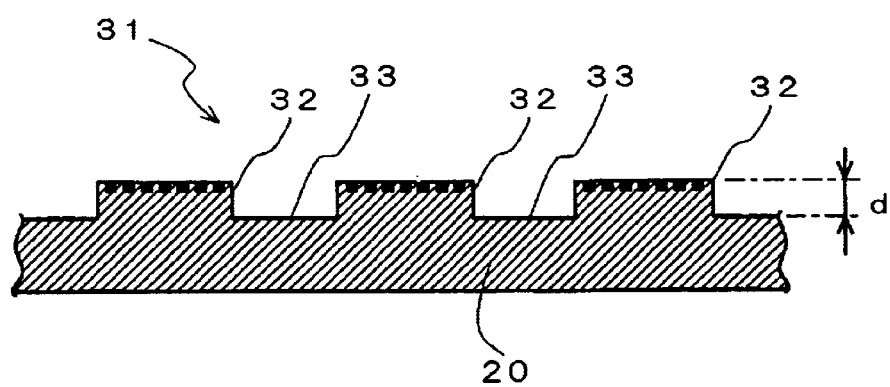
FIG. 7B is a cross-sectional view taken along a line Y-Y' of FIG. 7A.

FIG. 7 shows a structure of the master information carrier according to a second embodiment of the present invention. FIG. 7 is a plan view of the master information carrier, in which a display region V2 indicates an expanded main portion U2. As shown in FIG. 7A, on the surface of a disk-shaped master information carrier 31, elongated regions 32 are circumferentially provided at a predetermined angle pitch in a radius direction along which a fine ferromagnetic thin film pattern 32p (hatched region) corresponding to the preformat information signal is formed. FIG. 7B shows an expanded cross-sectional view of the master information carrier 31 taken along a dash-and-dot line Y-Y' of FIG. 7A. As shown in FIG. 7B, a region 33 (non-pattern-forming region) in which the ferromagnetic thin film pattern is not formed is set lower in surface level than a region 32 (pattern-forming region) in which the ferromagnetic thin film pattern 32p is formed. That is, a high-level region 32 and a low-level region 33 are formed on the nonmagnetic base member 20.

According to the second embodiment, of the rising edges defining the high-level region 32 from the low-level region 33, an inner radial edge 32a of the master information carrier 31 is formed into a polygonal shape consisting of two straight lines protruding externally (in the inner radial direction), specifically a wedge shaped flow promoting shape 32a. One of the two lines of the polygonal shape is an extension of one side of the high-level region 32. In this wedge shape, its bisect approximately agrees in structure with a straight line (which is indicated by a broken line in FIG. 7A) interconnecting the center 31a of the master information carrier 31 and the vertex of the flow promoting shape portion 32a.

In this case, the states shown in FIGS. 7A and 7B are simplified (deformed) for convenience in explanation; for example, in the dimensions and the numbers of the regions in which the ferromagnetic thin film pattern 32p is formed, those shown in Figs, are different from those of an actual master information carrier. Actually, for example, the high-level region 32 is given as many as 100 to 300.

The details of the ferromagnetic thin film pattern formed in the high-level region 32 and the method of forming the ferromagnetic thin film pattern on the surface of the nonmagnetic base member are the same as those described with the first embodiment and so are omitted in explanation (see FIG. 3).

The method for setting the surface level of the low-level region 33 lower than that of the high-level region 32 and that for transforming the edge 32a of the high-level region 32 into a wedge shape are the same as those of the first embodiment (see FIG. 3).

That is, a resist layer is formed on the nonmagnetic base member on which the ferromagnetic thin film pattern is formed and then, by photolithography and the like, covered only in the high-level region 32. Next, the low-level region 33 in which the resist layer is removed by dry etching and the like is etched to be lowered in surface level with respect to the high-level region 32. After that, the resist layer is removed by, e.g. a chemical. In this way, the master information carrier 31 is obtained in which the high-level region 32 having the ferromagnetic thin film pattern 32p formed therein and the low-level region 33 are formed on the nonmagnetic base member.

By transforming the resist layer into a polygonal shape consisting of two straight lines that protrudes externally (in the inner radial direction) in a convex shape within an inner radial portion of the disk-shaped nonmagnetic base member, specifically a wedge shape in the step of covering with the resist layer only the ferromagnetic thin film pattern 32p by photolithography, it is possible to form the wedge-shaped flow promoting shape portion 32a at the edge of the high-level region 32.

In the step of drying the master information carrier 31 to remove the detergent, minute foreign matter contained in the detergent may stagnate within the inner radial portion of the high-level region 32, to guard against which, this edge is transformed into the flow promoting portion 32a of a polygonal shape that protrudes externally, e.g. a wedge shape, thus minimizing the amount of stagnation of the detergent.

Accordingly, in the subsequent step of magnetically transferring the preformat information signal from the master information carrier 31 onto the magnetic recording medium, it is possible to uniformly adhere the ferromagnetic thin film pattern 32p of the high-level region 32 and the magnetic recording layer of the magnetic recording medium with each other. As a result, the high-reliability magnetic recording medium can be provided.

In this case, the shape of the flow promoting portion 32a of the inner radial edge may be, besides a wedge shape, any of polygon consisting of two lines or more as far as it protrudes externally and no matter whether the angle between those lines is an acute, right, or obtuse angle.

Figure 8A:
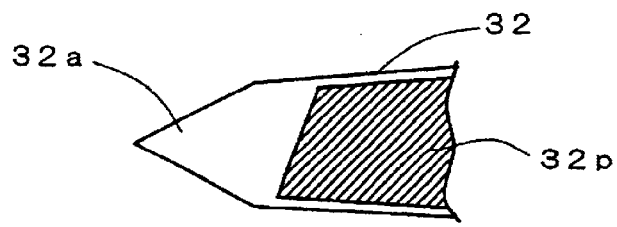
FIG. 8A is a schematic plan view for showing a deformation of the flow promoting shape portion according to the second embodiment of the present invention.
Figure 8B:
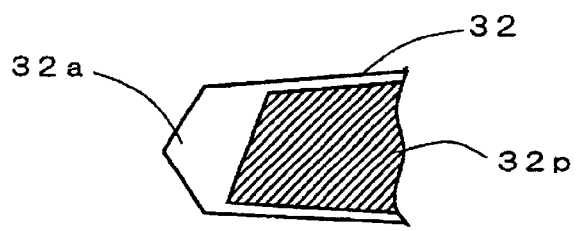
FIG. 8B is a schematic plan view for showing another deformation of the flow promoting shape.
Figure 8C:
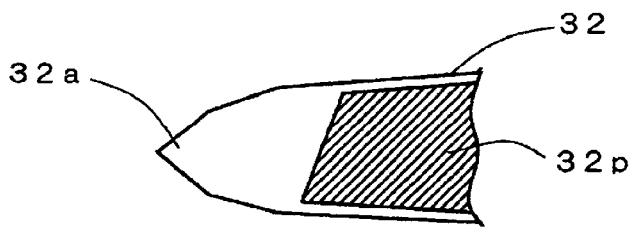
FIG. 8C is a schematic plan view for showing further another deformation of the flow promoting shape.
Figure 8D:
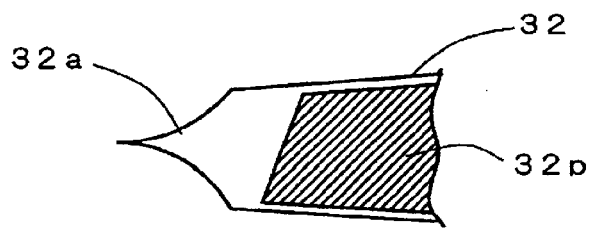
FIG. 8D is a schematic plan view for showing further another deformation of the flow promoting shape.

In an example shown in FIG. 8A, the flow promoting shape 32a is a polygon consisting of two straight lines forming an acute angle. In an example shown in FIG. 8B, it is a polygon consisting of two straight lines forming an obtuse angle. In an example shown in FIG. 8C, it is a polygon consisting of four straight lines. In an example shown in FIG. 8D, it is a polygon consisting of two curves which cave in, resulting in a convex shape as a whole.

Figure 8E:
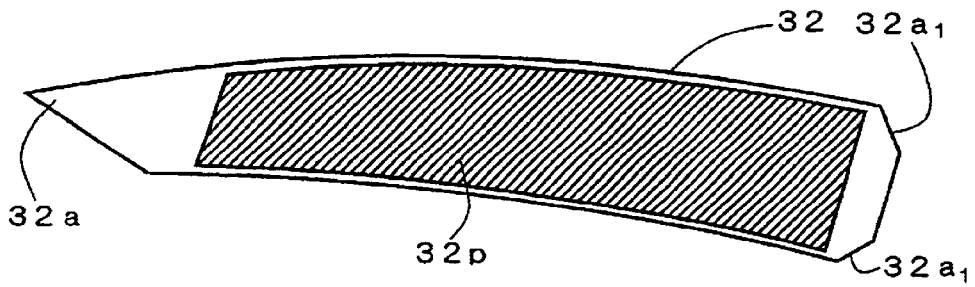
FIG. 8E is a schematic plan view for showing further another deformation of the flow promoting shape.

Further, the position of the flow promoting shape is not limited to an inner radial edge, for example, it may be formed at any other edge. In an example shown in FIG. 8E, two corners of the outer radial edge are chamfered and tapered to provide a flow promoting shape portion $32a_1$. The corners, where an eddy may occur in the flow of the detergent to stagnate it, can be rounded off to inhibit the occurrence of an eddy, thus preventing foreign matter from sticking.

Third Embodiment

Figure 9:
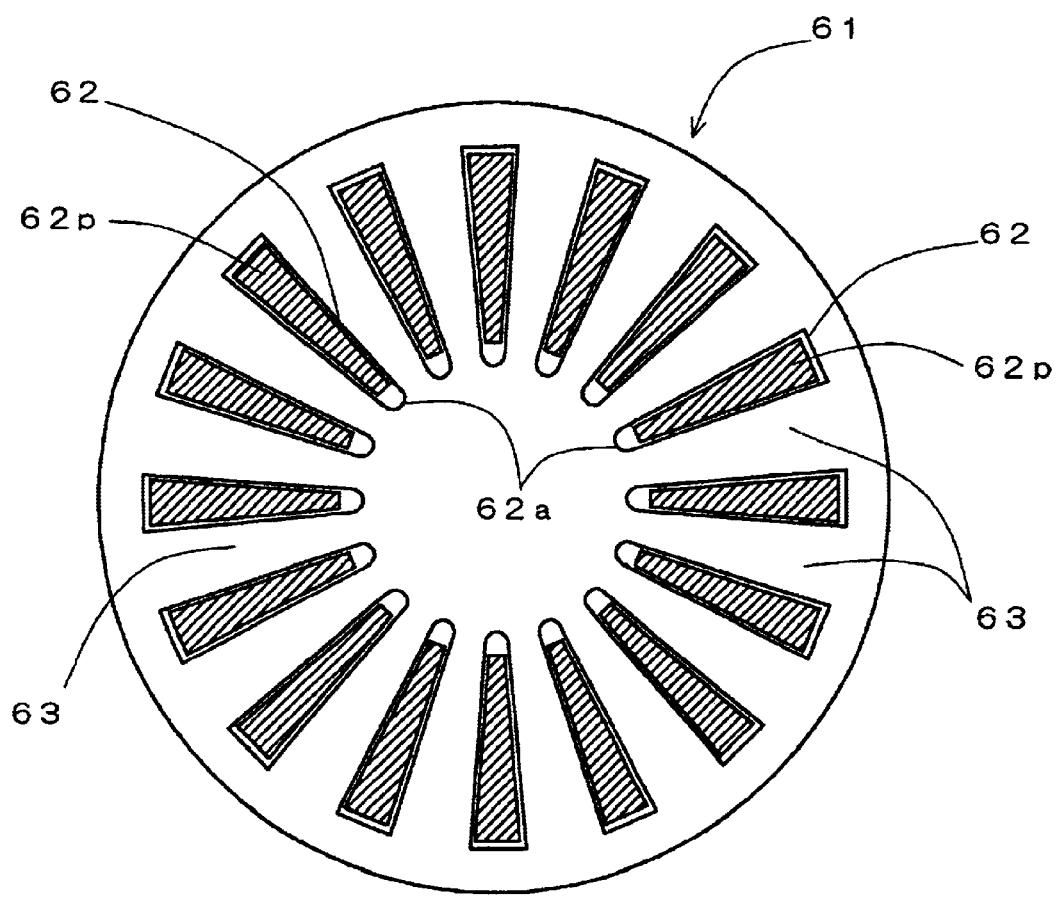
FIG. 9 is a plan view for schematically showing a structure of the master information carrier according to a third embodiment of the present invention.

FIG. 9 shows a structure of the master information carrier according to a third embodiment of the invention. In FIG. 9, a reference numeral 61 indicates the master information carrier, a reference numeral 62 indicates the high-level region, a reference numeral 62p indicates the ferromagnetic thin film pattern (hatched region), and a reference numeral 63 indicates the low-level region. In contrast to the first and second embodiments in which pluralities of the high-level regions 12 and 32 in which the preformat information signal is formed are radially arrayed in a moderate curved shape, in this embodiment, as shown in FIG. 9, the high-level regions 62 each extend straightly accurately radially. This embodiment is well suitable for a Zip or mini-disk (MD) type of the magnetic recording medium. In this case also, a curve-shaped flow promoting portion 62a is formed at an inner radial edge of the high-level region 62. In this case, the it may be shaped into a polygon. The others are the same as those of the first and second embodiments and so omitted here in explanation.

Fourth Embodiment

A medium manufacturing method of a magnetic recording medium according to a fourth embodiment of the present invention will be described below with reference to the drawings.

Figure 10:
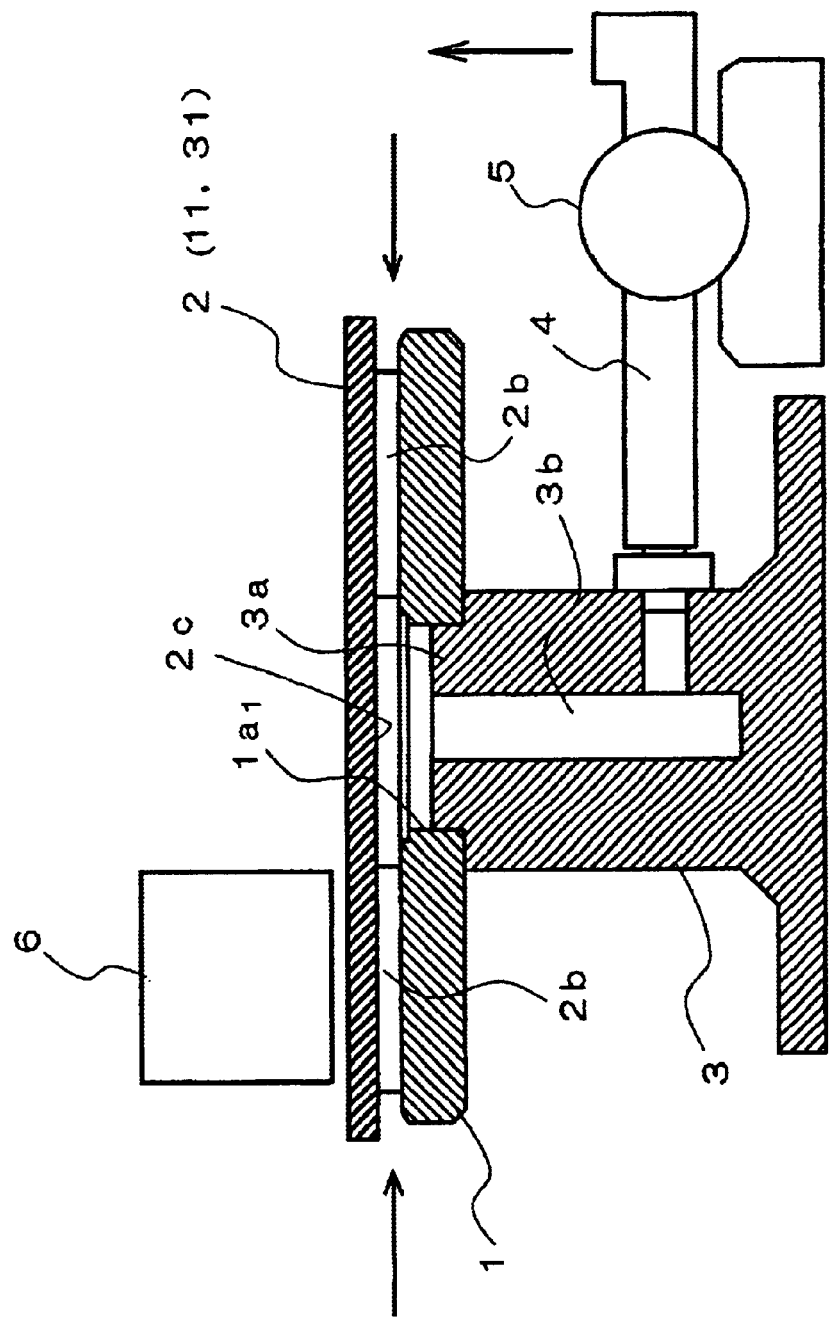
FIG. 10 is a cross-sectional view for showing an outline of an apparatus used for carrying out the manufacturing method of the magnetic recording medium according to a fourth embodiment of the present invention.

FIG. 10 shows an outline of an apparatus used for performing the manufacturing method of the magnetic recording medium according to the embodiment. In FIG. 10, the disk-shaped magnetic recording medium 1 constituting the magnetic recording medium 10 is obtained by forming, using a sputtering method, a magnetic recording layer 1b made of a ferromagnetic thin film mainly made of Co and the like on the surface of a donut-disk-shaped nonmagnetic base member 1a having a central hole 1a1 formed therein (see FIG. 19).

A reference numeral 2 indicates the disk-shaped master information carrier which is superposed in arrangement on the surface of the magnetic recording layer 1b of the magnetic recording medium 1 so that it may contact therewith. This master information carrier 2 generally has a larger diameter than that the magnetic recording medium 1 and has a high-level region 2b and a low-level region 2c provided on a nonmagnetic base member 2a and a pattern of a ferromagnetic thin film 2d corresponding to the information signal formed on the surface of the high-level region 2b (see FIG. 17). As this master information carrier 2 is used the master information carrier 11 of the first embodiment, the master information carrier 31 of the second embodiment, or the master information carrier 61 of the third embodiment. The high-level region 2b corresponds to the high-level regions 12 and 32.

A reference numeral 3 indicates a disk holder for holding the magnetic recording medium 1, which the disk holder 3 has at its tip a chuck 3a for aligning and holding the magnetic recording medium 1. Further, in the disk holder 3 is provided an inhaling hole 3b which communicates with the central hole $1a_1$ in the magnetic recording medium 1 and which has its one end connected to a degassing duct 4.

Further, at an end of the degassing duct 4 is mounted a degassing device 5, which can be initiated to provide a negative pressure state in a space between the magnetic recording medium 1 and the master information carrier 2 through the inhaling hole 3b in the disk holder 3 and the degassing duct 4, in order to resultantly attract the master information carrier 2 toward the magnetic recording medium 1 so that the magnetic recording medium 1 may be superposed on the master information carrier 2 as aligned therewith. In this case, on the surface of the master information carrier 2 is there the low-level region 2c except the high-level region 2b, so that the magnetic recording medium 1 and the master information carrier 2 can surely be adhered each other by degassing the gap therebetween through a degassing path formed between the low-level region 2c and the magnetic recording medium 1.

A magnetizing head 6 is subjected to initially magnetize the magnetic recording layer 1b of the magnetic recording medium 1 and also to transfer and record an information signal from the master information carrier 2 onto the magnetic recording medium 1.

Figure 11:
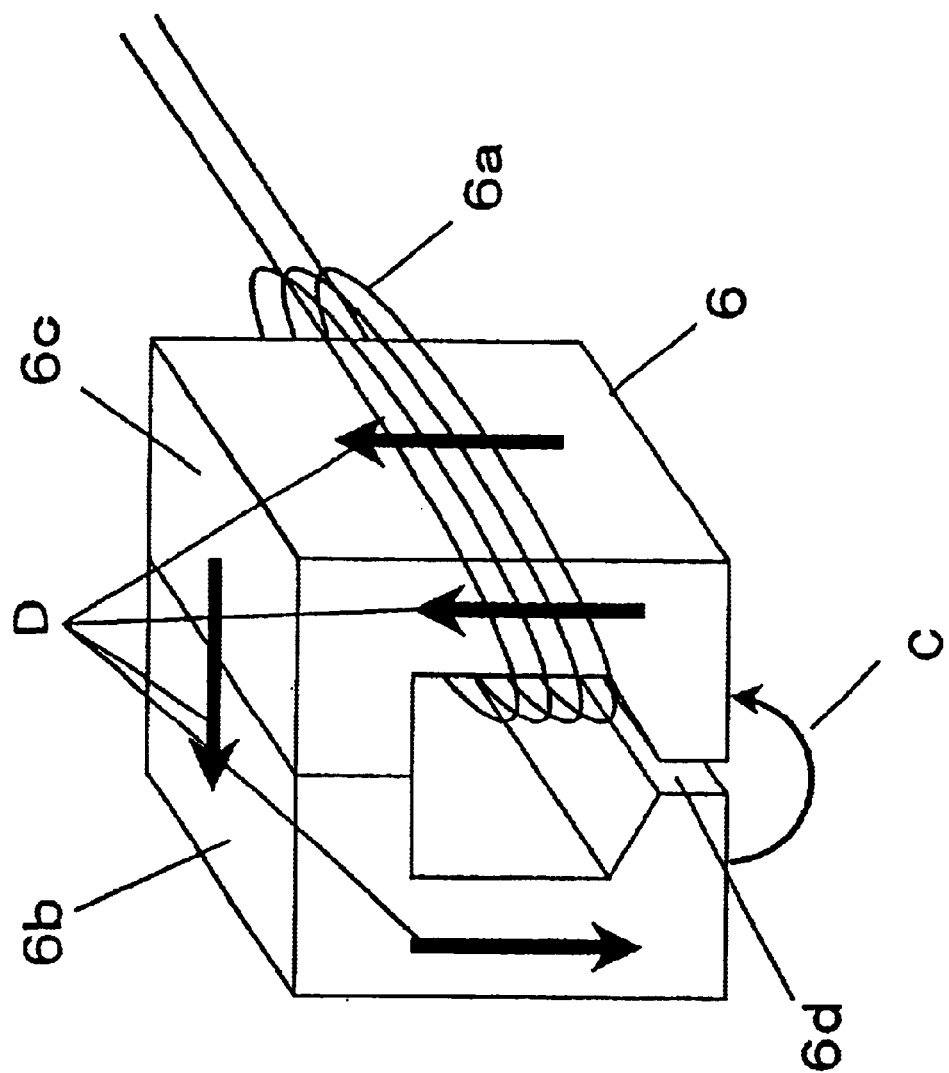
FIG. 11 is perspective view for showing an outline of a magnetizing head used in the manufacturing method of the magnetic recording medium according to the fourth embodiment of the present invention.

This magnetizing head 6, as shown in FIG. 11 for example, has such a structure that a first magnetic core 6b made of a ferromagnetic material is disposed opposite to a second magnetic core semi-sphere 6c which is made of a ferromagnetic material and which is provided with a winding 6a, thereby forming an annular magnetic circuit having a gap 6d, so that when a exciting current is applied to the winding 6a leakage flux occurs at the gap 6d flowing from the first magnetic core semi-sphere 6b to the second magnetic core semi-sphere 6c as shown by an arrow C and also when the flow of the current applied is reversed, the direction of the leakage flux occurring can be changed.

In this case, an arrow D indicates a direction of the internal flux occurring on the magnetic core semi-spheres 6b and 6c when leakage flux C occurs in a direction shown in FIG. 11.

Figure 12:
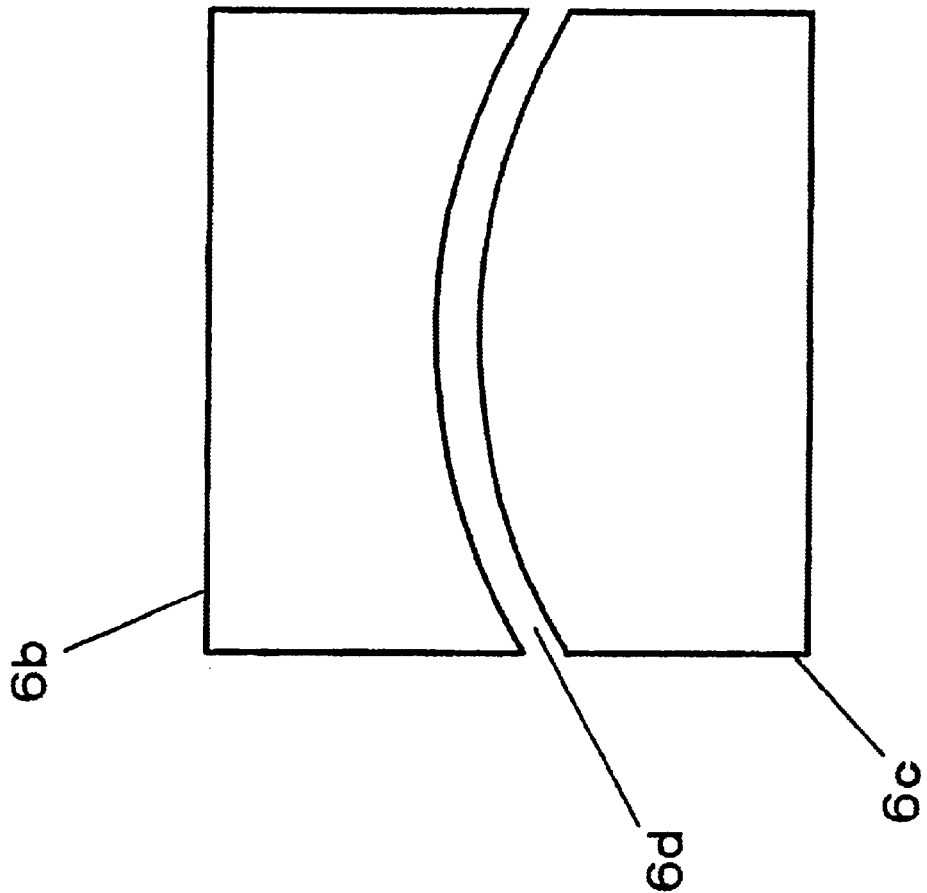
FIG. 12 is a plan view for showing one main face opposed to the master information carrier of the magnetizing head according to the fourth embodiment of the present invention.

Also note that as shown in FIG. 12, the gap 6d of the magnetizing head 6 has the same arc shape as a tracking scan trajectory (rotary trajectory of the tip of the head actuator) of the recording/reproducing magnetic head on the main surface of the head which opposes to the master information carrier 2. Therefore, the direction of a magnetic field occurring at the gap 6d is always perpendicular to the tracking scan trajectory, so that the ferromagnetic thin film of the master information carrier 2 is magnetized perpendicularly to a tracking scan direction of the recording/reproducing head in all the tracks. That is, it is magnetized in the same direction as the longitudinal direction of the head gap of the recording/reproducing magnetic head.

Next, a process for transferring and recording the information signal corresponding to the pattern shape formed in the master information carrier 2 on the disk-shaped magnetic recording medium 1 will be described.

Figure 13:
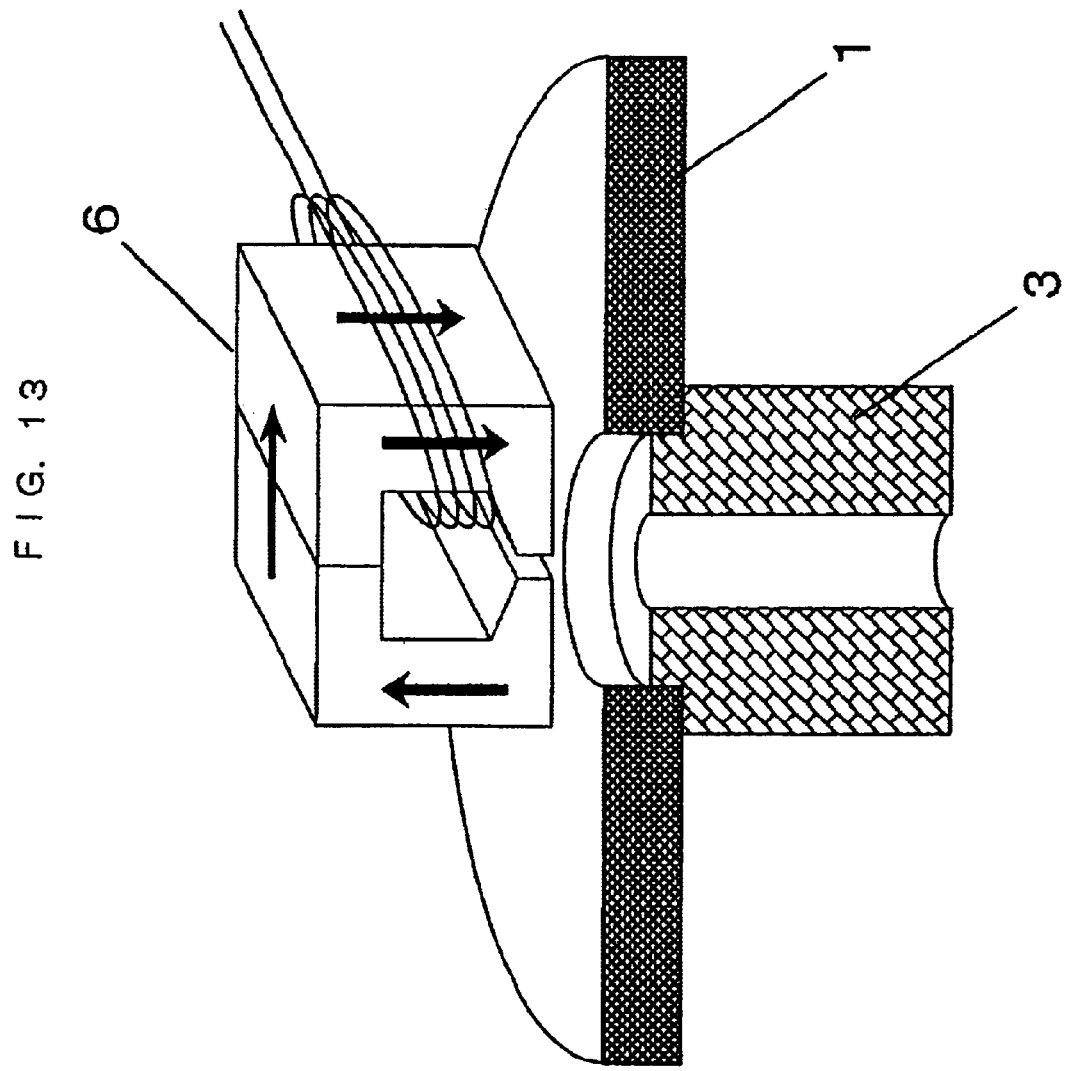
FIG. 13 is a perspective view for showing a situation in which a one-directional magnetic field is applied to the magnetic recording medium by the manufacturing method of the magnetic recording medium according to the fourth embodiment of the present invention.
Figure 14:
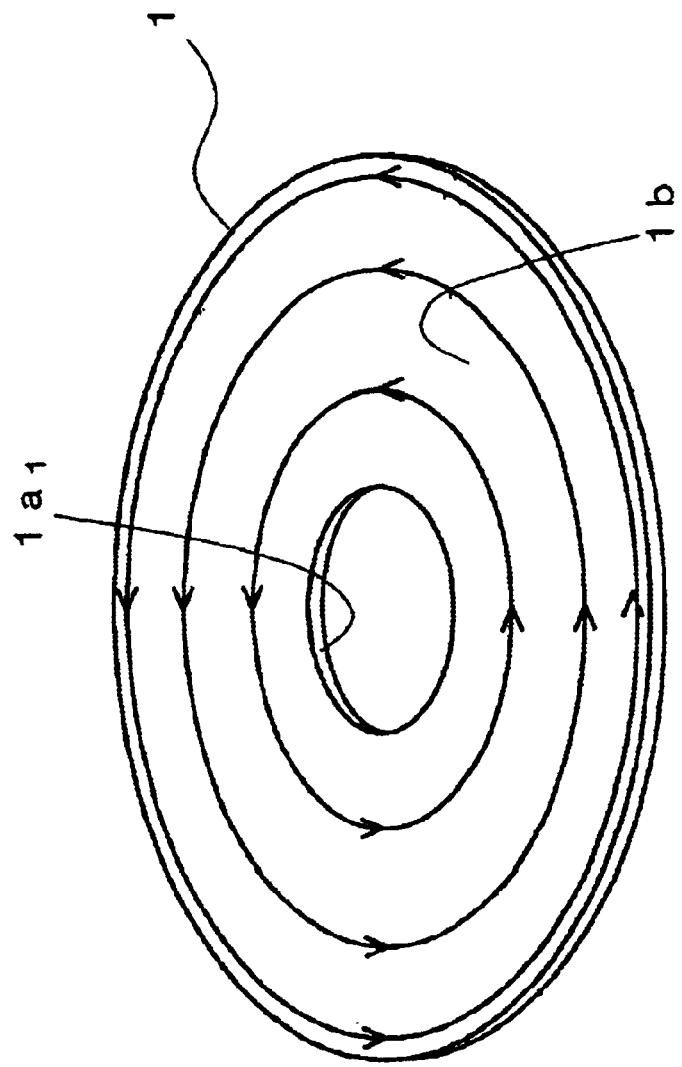
FIG. 14 is a perspective view for schematically showing a situation of a magnetic recording medium magnetized in one direction by a step shown in FIG. 13.

First, as shown in FIG. 13, by rotating the magnetizing head 6 as disposed near the magnetic recording medium 1 in parallel with the magnetic recording medium 1 with the central axis of the magnetic recording medium 1 as a rotary axis, the magnetic recording layer 1b of the magnetic recording medium 1 is one-directionally magnetized as shown by an arrow in FIG. 14 (initial magnetization).

Next, as shown in FIG. 10 in the above description, by initiating the degassing apparatus 5 with the master information carrier 2 as aligned with and superposed on the magnetic recording medium 1, the master information carrier 2 is degassed through the central hole $1a_1$ in the magnetic recording medium 1 to superpose one on the other the magnetic recording medium 1 and all of a plurality of the high-level regions 2b in which the ferromagnetic thin film pattern of the master information carrier 2 is formed so that they may be uniformly adhered each other.

Figure 15:
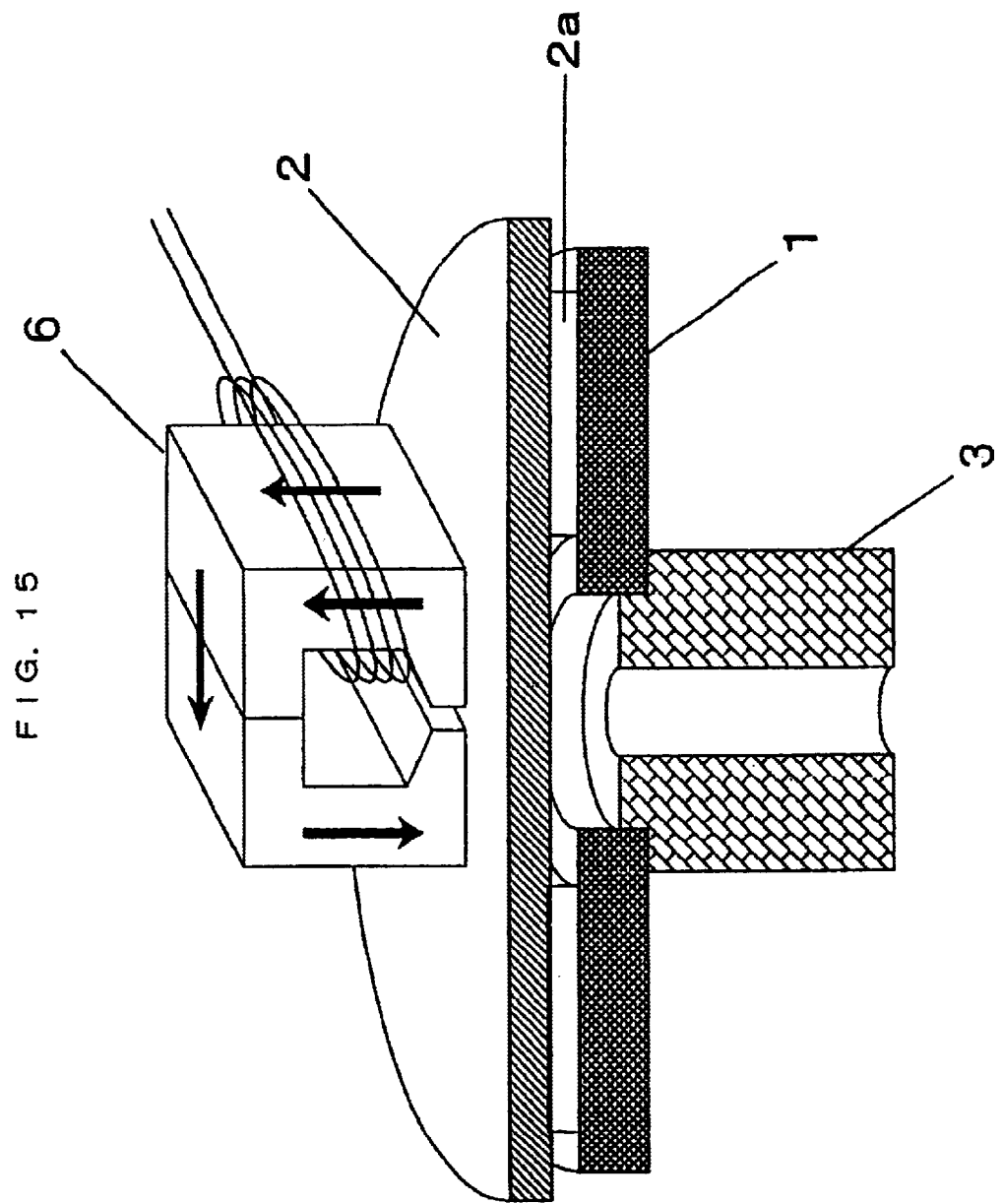
FIG. 15 is a perspective view for showing a situation in which a preformat information signal is transferred and recorded on a magnetic recording medium by the manufacturing method of the magnetic recording medium according to the fourth embodiment of the present invention.
Figure 16:
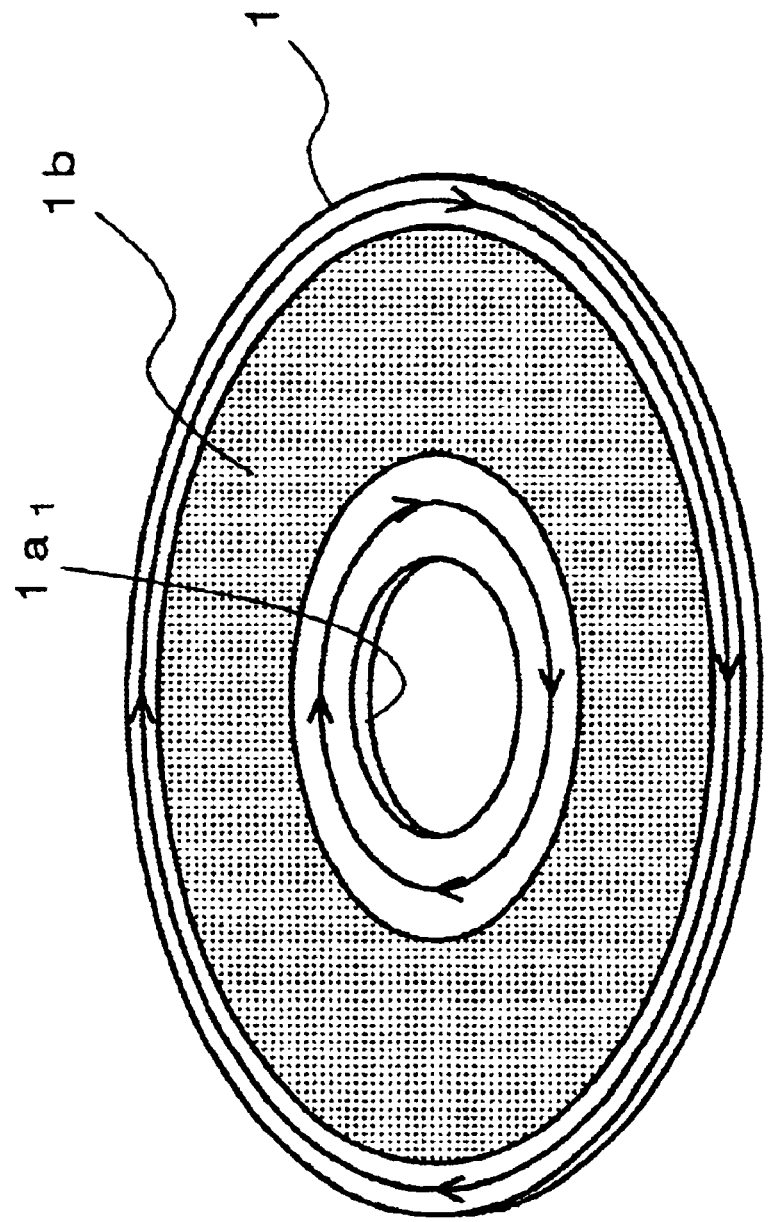
FIG. 16 is a perspective view for schematically showing a situation in which an information signal is recorded on a magnetic recording medium by a step shown in FIG. 15.

After that, as shown in FIG. 15, by applying a magnetic field opposite in polarity to the initial magnetization on the magnetizing head 6 and also by rotating the magnetizing head 6 in parallel with the master information carrier 2 with the center of the magnetic recording medium 1 held by the disk holder 3 as a rotary center, an exciting direct current external magnetic field is applied on the master information carrier 2. The rotation may be either clockwise or counter-clockwise. Thus, the ferromagnetic thin film layer 2d forming a pattern which corresponds to the information signal of the master information carrier 2 is magnetized and, as shown in FIG. 16, an information signal corresponding to the information signal pattern is transferred and recorded on the magnetic recording layer 1b of the magnetic recording medium 1 superposed on the master information carrier 2. An arrow in FIG. 16 indicates a direction of magnetization remaining outside the region in which the information signal is recorded on the magnetic recording medium 1.

Figure 17:
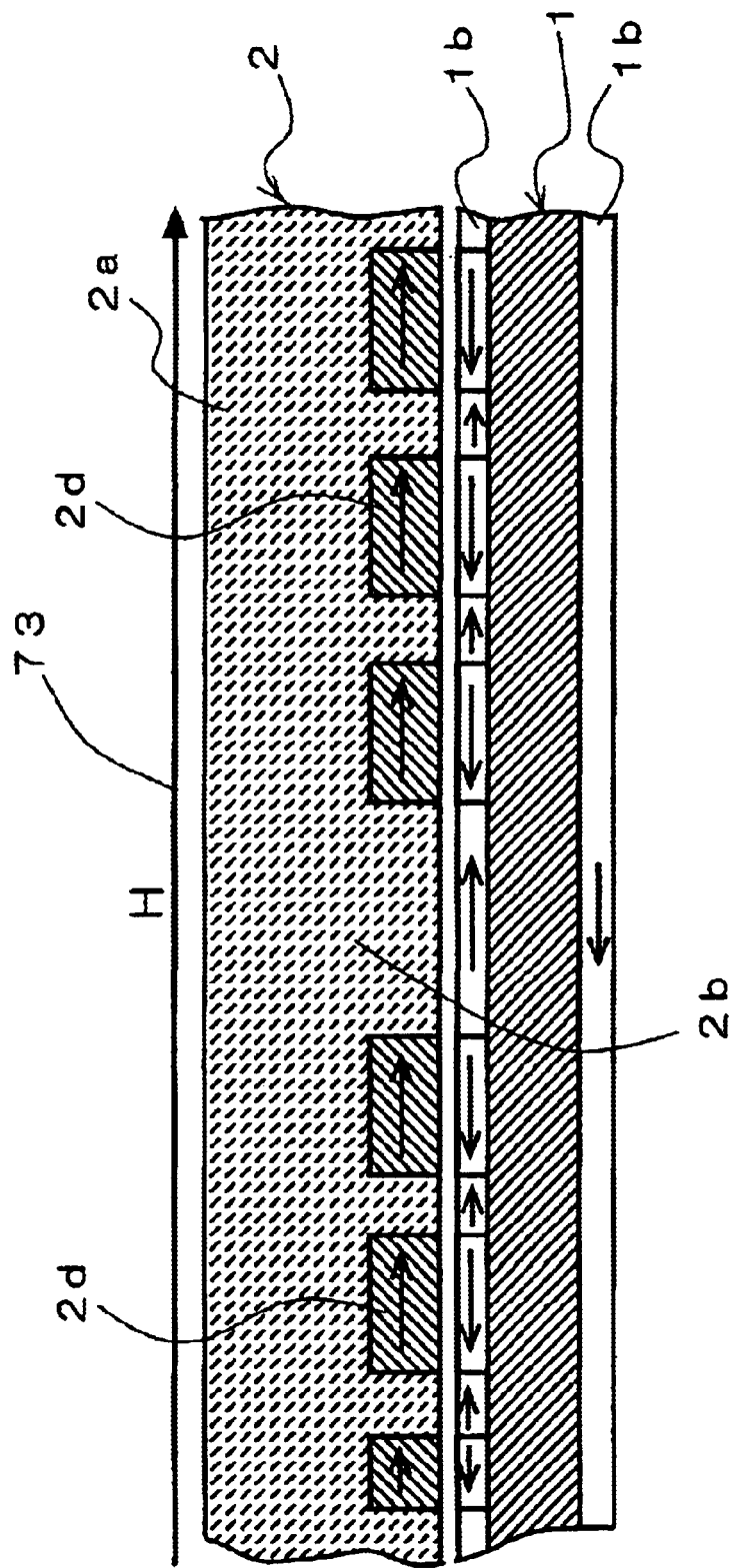
FIG. 17 is a description view for describing a situation of a magnetization pattern in the case that the information signal is transferred and recorded on the magnetic recording medium by a step shown in FIG. 15.

FIG. 17 shows in details the magnetization when the information signal is transferred and recorded. The master information carrier 2 is shown to have the high-level region 2b formed thereon in FIG. 17. As shown in FIG. 17, by applying an external magnetic field on the master information carrier 2 as adhered to the magnetic recording layer 1b of the magnetic recording medium 1 to magnetize the ferromagnetic thin film 2d on the master information carrier 2, the information signal is recorded on the magnetic recording layer 1b of the magnetic recording medium 1.

Figure 18A:
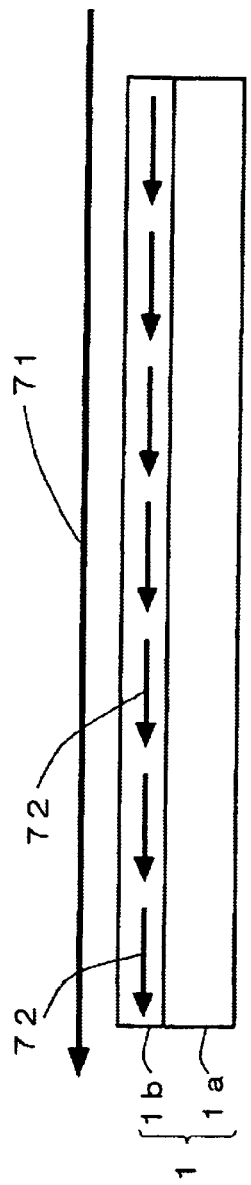
FIG. 18A is a schematic diagram for showing one step of a preferred state of preformat recording with a master information carrier by the manufacturing method of the magnetic recording medium according to the fourth embodiment of the present invention.
Figure 18B:
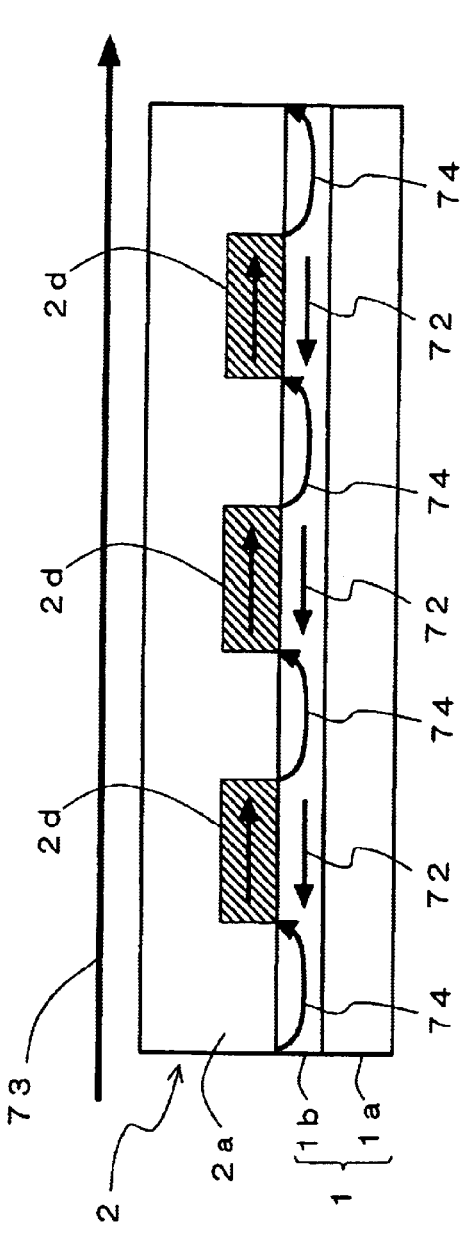
FIG. 18B is a cross-sectional view for showing a subsequent step.
Figure 18C:
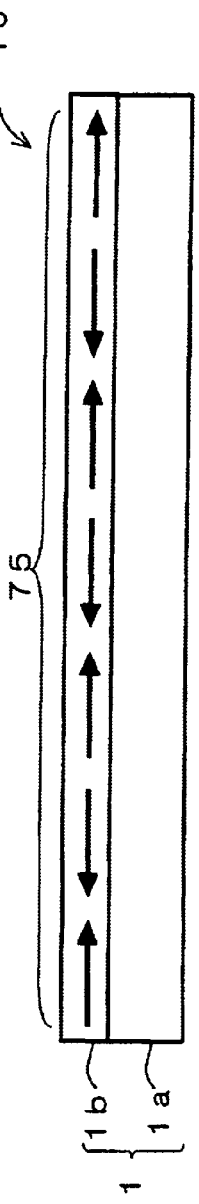
FIG. 18C is a cross-sectional view for showing a further subsequent step.

The transferring and recording method is described in detail below. The processes of the above-mentioned preformat recording are shown in FIG. 18, FIG. 18A of which indicates a process of erasing a direct current of the magnetic recording medium, FIG. 18B of which indicates a process of recording the information signal by use of the master information carrier 2, and FIG. 18C of which indicates a residual magnetization state of the magnetic recording medium 1 after preformat-recording in their respective cross sections in a length direction of the information signal track. The length direction of the information signal track agrees with the circumferential direction of the disk.

As shown in FIG. 18A, by applying an erasing direct current magnetic field 71 before the information signal is transferred and recorded using the master information carrier 2, the magnetic recording layer 1b on the magnetic recording medium 1 is uniformly d.c. erased so as to have constant directional magnetization 72.

Next, as shown in FIG. 18B, the surface of the master information carrier 2 on which is formed the ferromagnetic thin film 2d of a pattern corresponding to the information signal is adhered with the surface of the magnetic recording layer 1b on the magnetic recording medium 1 to apply an exciting direct current magnetic field 73 thereon from the magnetizing head 6, thus excitedly magnetizing the ferromagnetic thin film 2d. In this case, the polarity of the exciting direct current magnetic field 73 is opposite to that of the erasing direct current magnetic field 71. With this, only in a space between the ferromagnetic thin films 2d, the magnetization 72 of the magnetic recording layer 1b on the magnetic recording medium 1 is reversed by the leakage flux 74. As a result, after the master information carrier 2 is removed, it is possible to record a magnetization pattern 75 which corresponds to the array pattern of the ferromagnetic thin films 2d formed on the master information carrier 2 onto the magnetic recording layer 1b on the magnetic recording medium 1.

Thus, the ferromagnetic thin film pattern 2p which corresponds to the information signal on the master information carrier 2 is transferred and recorded as the magnetization pattern 75 of the information signal onto the magnetic recording layer 1b of the magnetic recording medium 1, thus obtaining the magnetic recording medium 10. Since the master information carrier 2 employed is highly cleaned due to its flow promoting portion shape in the high-level region 2b and free of foreign matter stuck and residing thereon, the magnetic recording medium 1 and the master information carrier 2 can be highly adhered each other, thus resulting in obtaining the magnetic recording medium 10 on which the preformat information signal is magnetically transferred at high accuracy.

Figure 19:
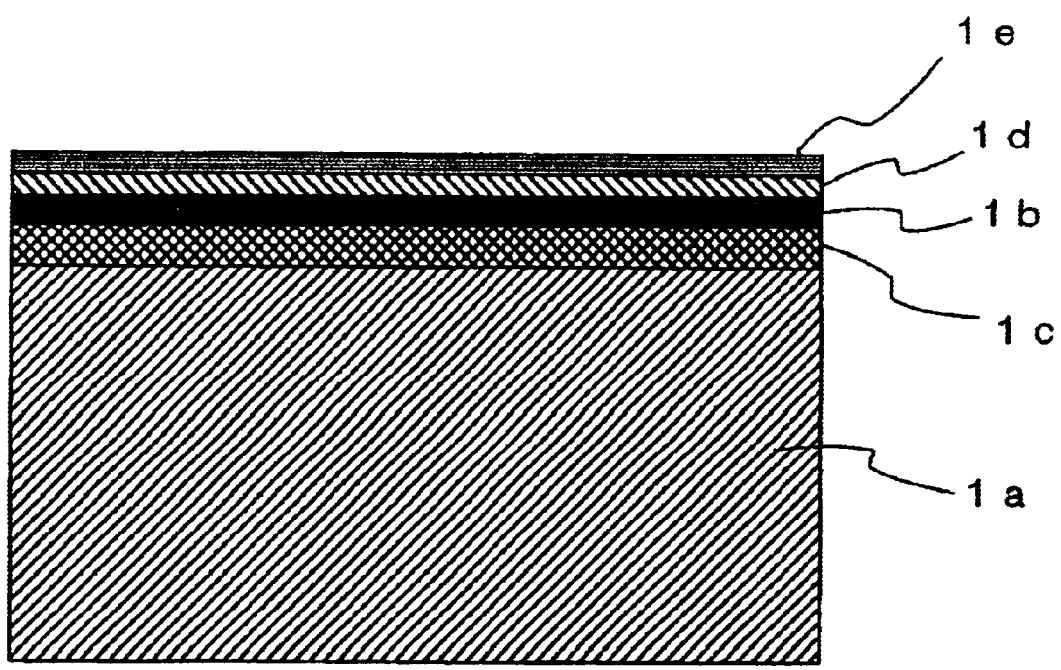
FIG. 19 is a schematic cross-sectional view for showing a magnetic recording medium obtained by the manufacturing method of the magnetic recording medium according to the fourth embodiment of the present invention.

Although in the above-described construction of the magnetic recording medium 10, the magnetic recording layer 1b is formed on the nonmagnetic base member 1a, more specifically, as shown in FIG. 19, an underlying layer 1c is formed on a nonmagnetic base member 1a such as a glass base member, on which is formed the magnetic recording layer 1b, on which is in turn formed a protecting layer 1d, on which is finally formed a lubricant layer 1e, to provide the magnetic recording medium 10.

In this case, a publicly known layer may be used as the magnetic recording layer and others. The underlying layer 1c may be made of a Cr material using, for example, sputtering. The magnetic recording layer 1b may be made of, for example, a Co—Cr—Pt-based material. The protecting layer 1d may be made of a carbon material. The lubricant layer 1e may be made of a fluorine-based liquid lubricant applied thereon using, for example, a dip-coating method.

Although the magnetic recording medium 10 has been described mainly as applied to a hard disk mounted on a hard disk drive and the like, the invention is not limited to this; for example, it may be applied to such a magnetic recording medium as a flexible magnetic disk, a magnetic card, or a magnetic tape, to obtain the same effects as above.

Although the information signal recorded on the magnetic recording medium 10 has been described mainly as a preformat signal such as a tracking servo signal, an address information signal, or a reproduction clock signal, the invention is not limited to this in terms of the structure of an applicable information signal. For example, a structure of the invention can be used to record various data signals, audio signals, and video signals in principle. In this case, a soft disk medium can be mass-produced in copy by a method for manufacturing a magnetic recording medium using a master information carrier according to the invention.

Further, although the nonmagnetic base member 1a of the magnetic recording medium 10 has been described above as having the center hole $1a_1$ formed therein, the invention is not limited to this; for example, such a nonmagnetic base member may be used that has a series of axial protrusions integrally formed at the center thereof.

Further, the information recording medium manufacturing method of the invention may be applied not only to a magnetic recording medium but also to a variety of magneto-optical recording media and optical recording media.

Further, the invention can well be applied to manufacturing of disk-shaped magnetic recording media such as a fixed magnetic recording medium (hard disk), a removable magnetic recording medium, and a mass-capacity flexible medium, thus improving the efficiency in preformat recording.

Further, although FIG. 3 has shown such a relationship between the high-level region 12 and the ferromagnetic thin film pattern 12p that the ferromagnetic thin film 21 constituting the ferromagnetic thin film pattern 12p is laid on the surface of the high-level region 12, the invention is not limited to it; for example, a recess may be formed in the surface of the high-level region 12 for burying the ferromagnetic thin film therein.

As described above, according to the invention, by transforming the shape of an edge in a high-level region in which a pattern (which is represented by a ferromagnetic thin film pattern) corresponding to an information signal is formed into a flow promoting portion having a curved shape such as an arc or a polygonal shape such as a wedge, it is possible to prevent a detergent or foreign matter contained therein from stagnating at the edge during a step of drying the master information carrier to remove the detergent therefrom and also to eliminate a possibility of uniform tightness being deteriorated due to foreign matter trapped between the high-level region and the information recording medium when the master information carrier is adhered to the information recording medium, thereby uniformly adhering the two with each other at a high accuracy, thereby obtaining a high-reliability information recording medium in transferwise recording of the information signal.

While there has been described what is at present considered to be preferred embodiments of the invention, it will be understood that various modifications may be made therein, and it is intended to cover in the appended claims all such modifications as fall within the true spirit and scope of this invention.

What is claimed is:

1. A master information carrier comprising:
   a base member;
   a high-level region and a low-level region which are formed with a level difference therebetween on a surface of said base member;
   a shape pattern which corresponds to an information signal and which is formed on a surface of said high-level region, wherein
   a distal end of said high-level region has a flow promoting shape which is shaped to externally protrude so as to promote a flow of a detergent.

2. The master information carrier according to claim 1, wherein said flow promoting shape has a curved shape.

3. The master information carrier according to claim 2, wherein said curved shape is an arch shape.

4. The master information carrier according to claim 1, wherein said flow promoting shape is a polygonal shape consisting of a plurality of straight lines.

5. The master information carrier according to claim 4, wherein said polygonal shape is a wedge shape.

6. The master information carrier according to claim 1, wherein said base member has a disk shape and said flow promoting shape is formed at a distal end of said high-level region located at an inner radial position near a center of said base member.

7. The master information carrier according to claim 1, wherein said base member is a nonmagnetic base member and said pattern formed in said high-level region is a thin film pattern made of a ferromagnetic material.

8. The master information carrier according to claim 1, wherein said base member has a disk shape and a plurality of said high-level regions are circumferentially formed approximately radially on said disk-shaped base member in such a structure that each adjacent two of said high-level regions interpose said low-level region therebetween.

9. The master information carrier according to claim 1, wherein said high-level region in which said pattern is formed serves to provide partial contact with a recording layer of an information recording medium, and said low-level region is left non-contacted to said recording layer of said information recording medium, serving to form a degassing path between said recording layer and said low-level region.

10. An information recording medium manufacturing method comprising the steps of:
    superposing a master information carrier having an information signal pattern formed on a surface of a high-level region of a base member and a fluid flow promoting shape formed at a distal end of said high-level region onto an information recording medium so that said high-level region contacts said recording medium; and transferring and recording said information signal pattern on said master information carrier as an information signal onto said information recording medium.

11. The information recording medium manufacturing method according to claim 10, wherein:

said base member is nonmagnetic and said information signal pattern is made of a shape pattern of a ferromagnetic thin film, wherein the method further comprises the steps of:

applying an external magnetic field to magnetize said ferromagnetic thin film corresponding to said information signal pattern while in said superposition state, whereby leakage flux is utilized to transfer and record said information signal pattern as a magnetization pattern onto a magnetic recording layer of said magnetic recording medium.

12. The information recording medium manufacturing method according to claim 10, wherein:

said base member is nonmagnetic and said information signal pattern is made of a shape pattern of a ferromagnetic thin film, wherein the method further comprises the steps of:

prior to said superposition, applying a first external magnetic field on said information recording medium to initially magnetize said magnetic recording layer of said information recording medium; and subsequently at time of said superposition, applying a second external magnetic field having a polarity opposite to that of said first external magnetic field to transfer and record said information signal pattern as a magnetization pattern onto said magnetic recording layer of said magnetic recording medium.

13. The information recording medium manufacturing method according to claim 10, wherein:

in said step of superposition, said high level region is substantially free from foreign matter and said high level region contacts said recording medium in a substantially uniform manner.

* * * * *